(12) United States Patent
Sasaki

(10) Patent No.: US 10,727,490 B2
(45) Date of Patent: Jul. 28, 2020

(54) BATTERY

(71) Applicant: Panasonic Intellectual Property Management Co., Ltd., Osaka (JP)

(72) Inventor: Izuru Sasaki, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 205 days.

(21) Appl. No.: 15/787,643

(22) Filed: Oct. 18, 2017

(65) Prior Publication Data

US 2018/0183065 A1 Jun. 28, 2018

(30) Foreign Application Priority Data

Dec. 28, 2016 (JP) ................................. 2016-254952

(51) Int. Cl.

| H01M 2/16 | (2006.01) |
|---|---|
| H01M 4/62 | (2006.01) |
| H01M 10/0562 | (2010.01) |
| H01M 10/654 | (2014.01) |
| H01M 10/42 | (2006.01) |
| H01M 10/058 | (2010.01) |
| H01M 10/052 | (2010.01) |

(52) U.S. Cl.
CPC ............ *H01M 4/625* (2013.01); *H01M 2/16* (2013.01); *H01M 2/1606* (2013.01); *H01M 2/1646* (2013.01); *H01M 4/624* (2013.01); *H01M 4/626* (2013.01); *H01M 10/052* (2013.01); *H01M 10/058* (2013.01); *H01M 10/0562* (2013.01); *H01M 10/4235* (2013.01); *H01M 10/654* (2015.04); *H01M 2300/0068* (2013.01)

(58) Field of Classification Search
CPC ........................ H01M 10/0562; H01M 10/654
See application file for complete search history.

(56) References Cited

U.S. PATENT DOCUMENTS

| 7,803,486 | B2* | 9/2010 | Nakamura | H01G 9/025 |
| | | | | 429/188 |
| 2007/0015060 | A1* | 1/2007 | Klaassen | H01B 1/122 |
| | | | | 429/309 |
| 2013/0017425 | A1* | 1/2013 | Watanabe | H01M 2/1077 |
| | | | | 429/94 |
| 2014/0295263 | A1 | 10/2014 | Iwama et al. | |
| 2017/0331092 | A1* | 11/2017 | Chen | H01M 2/168 |

FOREIGN PATENT DOCUMENTS

| JP | 10-270005 | 10/1998 |
| JP | 2006-351326 | 12/2006 |
| JP | 2008-282558 | 11/2008 |
| JP | 2014-191912 | 10/2014 |

* cited by examiner

*Primary Examiner* — Jonathan Crepeau
(74) *Attorney, Agent, or Firm* — McDermott Will & Emery LLP

(57) ABSTRACT

A battery according to one aspect of the present disclosure includes a first electrode layer, a first counter electrode layer being a counter electrode of the first electrode layer, a first solid electrolyte layer located between the first electrode layer and the first counter electrode layer, and a first heat-conducting layer including a first region containing a heat-conducting material. The first region is located between the first electrode layer and the first solid electrolyte layer.

19 Claims, 20 Drawing Sheets

2200

2300

3100

3200

4200

4300

4400

4600

4700

BATTERY

BACKGROUND

1. Technical Field

The present disclosure relates to a battery.

2. Description of the Related Art

Japanese Unexamined Patent Application Publication No. 2014-191912 (Patent Document 1) discloses a secondary battery including a positive electrode, a negative electrode, and a separator, at least one of which contains a plurality of thermally conductive particles.

Japanese Unexamined Patent Application Publication No. 2006-351326 (Patent Document 2) discloses a solid-state battery including an electricity-generating element covered with a protective film containing a thermally conductive filler.

SUMMARY

Long-life batteries are desirable in the related art.

In one general aspect, the techniques disclosed here feature a battery including a first electrode layer, a first counter electrode layer being a counter electrode of the first electrode layer, a first solid electrolyte layer located between the first electrode layer and the first counter electrode layer, and a first heat-conducting layer including a first region containing a heat-conducting material. The first region is located between the first electrode layer and the first solid electrolyte layer.

According to the present disclosure, a long-life battery can be provided.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Embodiments will now be described with reference to the drawings.

The inventor's point of view is first described below.

Batteries that use liquid electrolytes and gel electrolytes composed of liquid electrolytes and polymeric compounds have high heat dissipation performance because of the flowability of these electrolytes.

In contrast, batteries that use solid electrolytes have low heat dissipation performance because solid electrolytes have no flowability and also because the materials themselves have low thermal conductivity. It is therefore difficult to maintain a uniform temperature inside the battery, which leads to variations in characteristics at different sites. As a result, a problem exists in that the battery life is shortened. In addition, if an internal short circuit occurs in the battery, Joule heat generated at the site where the internal short circuit has occurred cannot propagate into the surrounding area because of the low heat dissipation performance, which leads to a local temperature rise. As a result, a problem exists in that the battery reliability is decreased.

Patent Document 1 discloses a secondary battery including a positive electrode, a negative electrode, and a separator, at least one of which contains a plurality of thermally conductive particles. The configuration disclosed in Patent Document 1 uses an organic liquid electrolyte or a gel electrolyte composed of an organic liquid electrolyte and a polymeric compound. These materials have high heat dissipation performance because of their flowability. Patent Document 1, however, does not disclose a material or configuration suitable for a battery that uses a solid electrolyte, rather than an organic liquid electrolyte.

Patent Document 2 discloses a solid-state battery including an electricity-generating element covered with a protective film containing a thermally conductive filler. The configuration disclosed in Patent Document 2 does not allow heat generated inside the battery to propagate efficiently outside the battery since a protective film is simply disposed around the electricity-generating element.

The present disclosure has been made in view of the foregoing problems. According to the present disclosure, the heat dissipation performance of a battery that uses a solid electrolyte can be improved. As a result, a battery with a long life and high reliability can be provided.

First Embodiment

Figure 1:
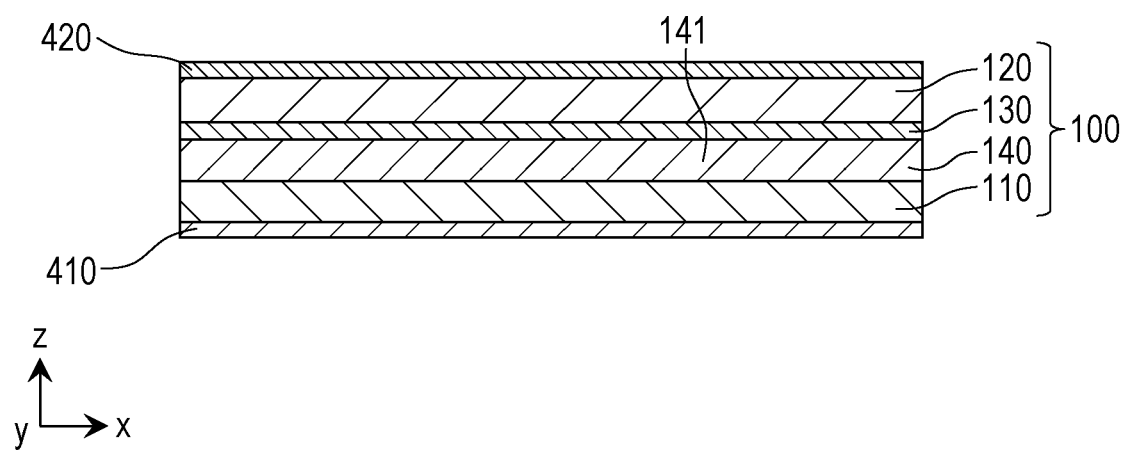
FIG. 1 is an x-z view (sectional view) showing, in outline, the configuration of a battery 1000 according to a first embodiment.

FIG. 1 is an x-z view (sectional view) showing, in outline, the configuration of a battery 1000 according to a first embodiment.

The battery 1000 according to the first embodiment includes a first electrode layer 110, a first counter electrode layer 120, a first solid electrolyte layer 130, and a first heat-conducting layer 140.

The first electrode layer 110 contains a first electrode material.

The first counter electrode layer 120 contains a first counter electrode material. The first counter electrode layer 120 serves as a counter electrode for the first electrode layer 110.

The first solid electrolyte layer 130 contains a first solid electrolyte material. The first solid electrolyte layer 130 is located between the first electrode layer 110 and the first counter electrode layer 120.

The first heat-conducting layer 140 includes a first region 141 containing a heat-conducting material.

The first region 141 is located between the first electrode layer 110 and the first solid electrolyte layer 130.

This configuration provides a battery with a long life and high reliability.

Specifically, this configuration allows heat to propagate (diffuse) from the first solid electrolyte layer 130 through the heat-conducting material present in the first region 141 of the first heat-conducting layer 140 located between the first electrode layer 110 and the first solid electrolyte layer 130. Thus, for example, when heat is generated inside the battery during a charge-discharge reaction, the heat can propagate (diffuse) from the first solid electrolyte layer 130 through the first region 141 of the first heat-conducting layer 140. This reduces temperature nonuniformity (temperature variations) in the first solid electrolyte layer 130, which contains a solid electrolyte material (e.g., an inorganic solid electrolyte), which has low thermal conductivity and no flowability. Thus, a uniform temperature can be maintained inside the battery. This reduces variations in characteristics due to temperature variations at different sites inside the battery. As a result, the battery life can be extended.

In addition, if an internal short circuit occurs in the battery, this configuration allows Joule heat that can be generated at the site where the internal short circuit has occurred to propagate (diffuse) through the first region 141 of the first heat-conducting layer 140 into the surrounding area. This reduces a local temperature rise inside the battery. As a result, the battery reliability can be improved.

In the first embodiment, as shown in FIG. 1, the first electrode layer 110, the first counter electrode layer 120, the first solid electrolyte layer 130, and the first heat-conducting layer 140 may be stacked on top of each other to form a first electricity-generating element 100.

In the first embodiment, as shown in FIG. 1, a first current collector layer 410 and a second current collector layer 420 may be disposed at either end of the first electricity-generating element 100.

That is, the battery 1000 according to the first embodiment may further include the first current collector layer 410 and the second current collector layer 420.

The first current collector layer 410 includes a current collector electrically connected to (e.g., in direct contact with) the first electrode layer 110.

The second current collector layer 420 includes a current collector electrically connected to (e.g., in direct contact with) the first counter electrode layer 120.

In the first embodiment, the first electrode layer 110 may be a positive electrode layer. In this case, the first electrode material present in the first electrode layer 110 is a positive electrode material. In this case, the first current collector layer 410 includes a positive electrode current collector. In this case, the first counter electrode layer 120 is a negative electrode layer. In this case, the first counter electrode material present in the first counter electrode layer 120 is a negative electrode material. In this case, the second current collector layer 420 includes a negative electrode current collector.

Alternatively, in the first embodiment, the first electrode layer 110 may be a negative electrode layer. In this case, the first electrode material present in the first electrode layer 110 is a negative electrode material. In this case, the first current collector layer 410 includes a negative electrode current collector. In this case, the first counter electrode layer 120 is a positive electrode layer. In this case, the first counter electrode material present in the first counter electrode layer 120 is a positive electrode material. In this case, the second current collector layer 420 includes a positive electrode current collector.

The positive electrode layer contains a positive electrode active material, which is an example of a positive electrode material (i.e., a positive electrode active material layer).

Examples of positive electrode active materials that may be used in the positive electrode layer include lithium transition metal oxides, transition metal fluorides, polyanionic and fluorinated polyanionic materials, transition metal sulfides, transition metal oxyfluorides, transition metal oxysulfides, and transition metal oxynitrides. In particular, the use of lithium transition metal oxides as positive electrode active material particles decreases the manufacturing costs and increases the average discharge voltage.

The positive electrode layer may be a positive electrode mixture layer containing a positive electrode active material and a solid electrolyte. The solid electrolyte present in the positive electrode layer may be selected from those mentioned for the solid electrolyte present in the first solid electrolyte layer 130, or may be selected from different solid electrolytes.

The positive electrode layer may have a thickness of 10 to 500 µm. If the positive electrode layer has a thickness of less than 10 µm, it may be difficult for the battery to deliver sufficient energy density. If the positive electrode layer has a thickness of more than 500 µm, it may be difficult for the battery to operate at high power.

Examples of positive electrode current collectors that may be used include porous and nonporous sheets and films formed of metal materials such as aluminum, stainless steel, titanium, and alloys thereof. Aluminum and aluminum alloys are inexpensive and are easy to form into thin films. Examples of sheets and films include metal foils and metal meshes. The positive electrode current collector may have a thickness of 1 to 30 µm. If the positive electrode current collector has a thickness of less than 1 µm, the positive electrode current collector is prone to cracking or tearing because of its insufficient mechanical strength. If the positive electrode current collector has a thickness of more than 30 µm, the energy density of the battery may be decreased.

The negative electrode layer contains a negative electrode active material, which is an example of a negative electrode material (i.e., a negative electrode active material layer).

The negative electrode material present in the negative electrode layer may be, for example, a material that accepts and releases metal ions. The negative electrode active material may be, for example, a material that accepts and releases lithium ions. Examples of negative electrode active materials that may be used include lithium metal, metals and alloys that undergo an alloying reaction with lithium, carbon materials, transition metal oxides, and transition metal sulfides. Examples of carbon materials include graphite and non-graphite carbon materials such as hard carbon and coke. Examples of transition metal oxides that may be used include CuO and NiO. Examples of transition metal sulfides that may be used include copper sulfide represented by the formula CuS. Examples of metals and alloys that undergo an alloying reaction with lithium include alloys of lithium with silicon compounds, tin compounds, and aluminum compounds. The use of carbon materials decreases the manufacturing costs and increases the average discharge voltage.

The negative electrode layer may be a negative electrode mixture layer containing a negative electrode active material and a solid electrolyte. The solid electrolyte present in the negative electrode layer may be selected from those mentioned for the solid electrolyte present in the first solid electrolyte layer 130, or may be selected from different solid electrolytes.

The negative electrode layer may have a thickness of 10 to 500 µm. If the negative electrode layer has a thickness of less than 10 µm, it may be difficult for the battery to deliver sufficient energy density. If the negative electrode layer has a thickness of more than 500 µm, it may be difficult for the battery to operate at high power.

Examples of negative electrode current collectors that may be used include porous and nonporous sheets and films formed of metal materials such as stainless steel, nickel, copper, and alloys thereof. Copper and copper alloys are inexpensive and are easy to form into thin films. Examples of sheets and films include metal foils and metal meshes. The negative electrode current collector may have a thickness of 1 to 30 µm. If the negative electrode current collector has a thickness of less than 1 µm, the negative electrode current collector is prone to cracking or tearing because of its insufficient mechanical strength. If the negative electrode current collector has a thickness of more than 30 µm, the energy density of the battery may be decreased.

To improve the electronic conductivity, at least one of the first electrode layer 110 and the first counter electrode layer 120 (i.e., the positive and negative electrode layers) may contain a conductive aid. Examples of conductive aids that may be used include graphites such as natural graphite and artificial graphite; carbon blacks such as acetylene black and Ketjen Black; conductive fibers such as carbon fibers and metal fibers; fluorinated carbon; metal powders such as aluminum powder; conductive whiskers such as zinc oxide whiskers and potassium titanate whiskers; conductive metal oxides such as titanium oxide; and conductive polymeric compounds such as polyaniline, polypyrrole, and polythiophene. The use of carbon conductive aids reduces the cost.

The first solid electrolyte layer 130 contains a solid electrolyte material.

Examples of solid electrolyte materials that may be used in the first solid electrolyte layer 130 include sulfide solid electrolytes, oxide solid electrolytes, halide solid electrolytes, polymer solid electrolytes, and complex hydride solid electrolytes.

Examples of sulfide solid electrolytes that may be used include $Li_2S-P_2S_5$, $Li_2S-SiS_2$, $Li_2S-B_2S_3$, $Li_2S-GeS_2$, $Li_{3.25}Ge_{0.25}P_{0.75}S_4$, and $Li_{10}GeP_2S_{12}$. These may be doped with other compounds such as LiX (where X is F, Cl, Br, or I), $Li_2O$, $MO_p$, and $Li_qMO_r$ (where M is P, Si, Ge, B, Al, Ga, In, Fe, or Zn; and p, q, and r are natural numbers).

Examples of oxide solid electrolytes that may be used include NASICON-type solid electrolytes such as $LiTi_2(PO_4)_3$ and element-substituted derivatives thereof; (LaLi)$TiO_3$-based perovskite-type solid electrolytes; LISICON-type solid electrolytes such as $Li_{14}ZnGe_4O_{16}$, $Li_4SiO_4$, $LiGeO_4$, and element-substituted derivatives thereof; garnet-type solid electrolytes such as $Li_7La_3Zr_2O_{12}$ and element-substituted derivatives thereof; $Li_3N$ and H-substituted derivatives thereof; $Li_3PO_4$ and N-substituted derivatives thereof; and glasses and glass ceramics based on Li—B—O compounds such as $LiBO_2$ and $Li_3BO_3$ and doped with other compounds such as $Li_2SO_4$ and $Li_2CO_3$.

Examples of halide solid electrolytes that may be used include $Li_3InBr_6$, $Li_3InCl_6$, $Li_2FeCl_4$, $Li_2CrCl_4$, and $Li_3OCl$.

Examples of complex hydride solid electrolytes that may be used include $LiBH_4-LiI$ and $LiBH_4-P_2S_5$.

Examples of polymer solid electrolytes that may be used include compounds of polymeric compounds with lithium salts. Such polymeric compounds may have an ethylene oxide structure. A polymeric compound having an ethylene oxide structure can contain a larger amount of lithium salt, thus improving the ionic conductivity. Examples of lithium salts that may be used include $LiPF_6$, $LiBF_4$, $LiSbF_6$, $LiAsF_6$, $LiSO_3CF_3$, $LiN(SO_2CF_3)_2$, $LiN(SO_2C_2F_5)_2$, $LiN(SO_2CF_3)(SO_2C_4F_9)$, and $LiC(SO_2CF_3)_3$. One lithium salt selected from these lithium salts may be used alone. Alternatively, a mixture of two or more lithium salts selected from these lithium salts may be used.

The solid electrolyte may take any form, such as needles, spheres, and ellipsoids. For example, if the solid electrolyte is composed of spheres, the solid electrolyte may have a median size of about 0.01 to 100 µm. If the solid electrolyte has a median size of less than 0.01 µm, the ionic conductivity is decreased because of increased grain boundary resistance. If the solid electrolyte has a median size of more than 100 µm, a layer containing the solid electrolyte (e.g., the first heat-conducting layer 140) cannot be made sufficiently thin, which degrades the power characteristics of the battery.

The first solid electrolyte layer 130 may have a thickness of 1 to 200 µm. A solid electrolyte layer having a thickness of less than 1 µm increases the risk of a short circuit between the positive and negative electrode layers. A solid electrolyte layer having a thickness of more than 200 µm may make it difficult for the battery to operate at high power.

The heat-conducting material present in the first heat-conducting layer 140 (first region 141) may be a material with good thermal conductivity. Examples of heat-conducting materials that may be used include graphites such as natural graphite and artificial graphite; carbon blacks such as acetylene black and Ketjen Black; fibrous carbon materials such as polyacrylonitrile-based carbon fibers, pitch-based carbon fibers, carbon nanotubes, and vapor-grown carbon fibers (VGCFs); plate-like carbon materials such as graphite sheets and graphene sheets; powdered, plate-like, and fibrous materials formed of metals such as Ni, Au, Ag, Cu, Zn, Al, Ag, stainless steel, and alloys thereof; conductive whiskers such as zinc oxide, tin oxide, indium oxide, potassium titanate, fluorinated carbon, and titanium nitride whiskers; conductive polymeric compounds such as polyaniline, polypyrrole, and polythiophene; and electronically insulating fillers such as aluminum oxide, boron nitride, aluminum nitride, and silicon nitride.

Heat-conducting materials with high aspect ratios may be used, including fibrous and plate-like materials. Disposing a heat-conducting material with a high aspect ratio such that the long side thereof is parallel to the stacking plane of the battery improves the thermal conductivity in a direction parallel to the stacking plane. Disposing a heat-conducting material with a high aspect ratio such that the long side thereof is perpendicular to the stacking plane of the battery improves the thermal conductivity in a direction perpendicular to the stacking plane. In particular, the use of fibrous and plate-like metal and carbon materials improves the thermal conductivity and reduces the cost.

If a particulate heat-conducting material is used, the heat-conducting material may have a particle size of less than 10 µm. If the particle size is more than 10 µm, a heat-conducting layer containing the heat-conducting material cannot be made sufficiently thin, which degrades the power characteristics of the battery.

If a fibrous heat-conducting material is used, the heat-conducting material may have a diameter of less than 1 µm. If the diameter is more than 1 µm, a heat-conducting layer containing the heat-conducting material cannot be made sufficiently thin, which degrades the power characteristics of the battery.

If a plate-like heat-conducting material is used, the heat-conducting material may have a thickness of less than 1 µm. If the thickness is more than 1 µm, a heat-conducting layer containing the heat-conducting material cannot be made sufficiently thin, which degrades the power characteristics of the battery.

The first heat-conducting layer 140 may have a thickness of 1 to 100 µm. If the first heat-conducting layer 140 has a thickness of less than 1 µm, sufficient thermal conductivity cannot be achieved. If the first heat-conducting layer 140 has a thickness of more than 100 µm, the ionic conductivity is decreased.

At least one of the first electrode layer 110, the first counter electrode layer 120 (i.e., the positive and negative electrode layers), the first solid electrolyte layer 130, and the first heat-conducting layer 140 may contain a binder to improve the adhesion between particles. The binder is used to improve the binding properties of the material that form the electrodes. Examples of binders include poly(vinylidene fluoride), polytetrafluoroethylene, polyethylene, polypropylene, aramid resin, polyimide, polyimide, polyimide-imide, polyacrylonitrile, poly(acrylic acid), poly(methyl acrylate), poly(ethyl acrylate), poly(hexyl acrylate), poly(methacrylic acid), poly(methyl methacrylate), poly(ethyl methacrylate), poly(hexyl methacrylate), poly(vinyl acetate), polyvinylpyrrolidone, polyether, polyethersulfone, polyhexafluoropropylene, styrene-butadiene rubber, and carboxymethylcellulose. Other binders that may be used include copolymers of two or more materials selected from tetrafluoroethylene, hexafluoroethylene, hexafluoropropylene, perfluoro(alkyl vinyl ether), vinylidene fluoride, chlorotrifluoroethylene, ethylene, propylene, pentafluoropropylene, fluoro(methyl vinyl ether), acrylic acid, and hexadiene. Mixtures of two or more binders selected from these binders may also be used as binders.

For example, if the battery 1000 according to the first embodiment is used as a battery for portable electronic devices such as smartphones and digital cameras, the battery 1000 may have a main surface area of 1 to 100 $cm^2$. Alternatively, if the battery 1000 is used as a battery for power supplies in large transportation equipment such as electric vehicles, the battery 1000 may have a main surface area of 100 to 1,000 $cm^2$.

In the first embodiment, the main surfaces of the first electricity-generating element 100 (i.e., the main surfaces of the layers forming the first electricity-generating element 100) and the main surfaces of the current collector layers may be square or of other shapes (e.g., rectangular or circular).

In the first embodiment, the first region 141 of the first heat-conducting layer 140 may contain a solid electrolyte material.

This configuration reduces the internal resistance of the battery and provides good battery characteristics (e.g., good charge-discharge characteristics). Heat-conducting materials have high thermal conductivity but have extremely low ionic conductivity. Therefore, if the first region 141 of the first heat-conducting layer 140 contains only a heat-conducting material, the first region 141 of the first heat-conducting layer 140 impedes the transfer of ions between the first electrode layer 110 (e.g., an active material layer) and the first solid electrolyte layer 130 (as a result, the battery would have high internal resistance and would not exhibit good battery characteristics). In contrast, solid electrolyte materials have low thermal conductivity but have high ionic conductivity. Therefore, if the first region 141 of the first heat-conducting layer 140 contains both a heat-conducting material and a solid electrolyte material, ions can be transferred between the first electrode layer 110 (e.g., an active material layer) and the first solid electrolyte layer 130 through the solid electrolyte material present in the first region 141 of the first heat-conducting layer 140. Thus, a first heat-conducting layer 140 with both high thermal conductivity and high ionic conductivity can be provided.

In the first embodiment, the solid electrolyte material present in the first region 141 of the first heat-conducting layer 140 may be selected from those mentioned for the solid electrolyte present in the first solid electrolyte layer 130, or may be selected from different materials.

In the first embodiment, the weight percentage of the heat-conducting material relative to that of the solid electrolyte material in the first region 141 of the first heat-conducting layer 140 may be 1% to 90% by weight. If the weight percentage of the heat-conducting material is less than 1% by weight, sufficient thermal conductivity cannot be achieved. If the weight percentage of the heat-conducting material is more than 90% by weight, the first region 141 of the first heat-conducting layer 140 has low ionic conductivity, which degrades the power characteristics of the battery. The weight percentage of the heat-conducting material may be 5% to 60% by weight. This improves the ionic conductivity and thermal conductivity of the first region 141 of the first heat-conducting layer 140.

In the first embodiment, the heat-conducting material present in the first region 141 of the first heat-conducting layer 140 may have a smaller particle size than the solid electrolyte material present in the first region 141 of the first heat-conducting layer 140. This prevents the contact of the heat-conducting material with itself from being hindered by the solid electrolyte, thus improving the thermal conductivity.

In the first embodiment, the first heat-conducting layer 140, the first solid electrolyte layer 130, the first electrode layer 110, and the first counter electrode layer 120 may contain the same solid electrolyte material or different solid electrolyte materials.

In the first embodiment, the first region 141 of the first heat-conducting layer 140 may be free of the first electrode material and the first counter electrode material.

This configuration further improves the thermal conductivity of the first region 141 of the first heat-conducting layer 140. Specifically, the absence of an electrode material (for example, an electrode active material) in the first region 141 prevents the contact of the heat-conducting material with itself from being interrupted by electrode materials. This avoids a decrease in thermal conductivity due to interruption of the contact of the heat-conducting material with itself by electrode materials.

In the first embodiment, the first solid electrolyte layer 130 may contain an inorganic solid electrolyte material (e.g., a sulfide solid electrolyte, an oxide solid electrolyte, a halide solid electrolyte, or a complex hydride solid electrolyte).

This configuration improves the ionic conductivity of the first solid electrolyte layer 130. In this case, the low thermal conductivity of the inorganic solid electrolyte material present in the first solid electrolyte layer 130 can be compensated for by the heat-conducting material present in the first region 141 of the first heat-conducting layer 140. Thus, the use of the first heat-conducting layer 140 in combination with a first solid electrolyte layer 130 containing an inorganic solid electrolyte material provides a battery with improved ionic conductivity and heat dissipation performance.

In the first embodiment, the first heat-conducting layer 140 (first region 141), the first solid electrolyte layer 130, the first electrode layer 110, and the first counter electrode layer 120 may be formed over the same area and at the same thickness. For example, as shown in FIG. 1, the ends of these layers may be located at the same positions.

Alternatively, in the first embodiment, the first heat-conducting layer 140 (first region 141), the first solid electrolyte layer 130, the first electrode layer 110, and the first counter electrode layer 120 may be formed over different areas and at different thicknesses, as in the example shown in FIG. 2 below.

Figure 2:
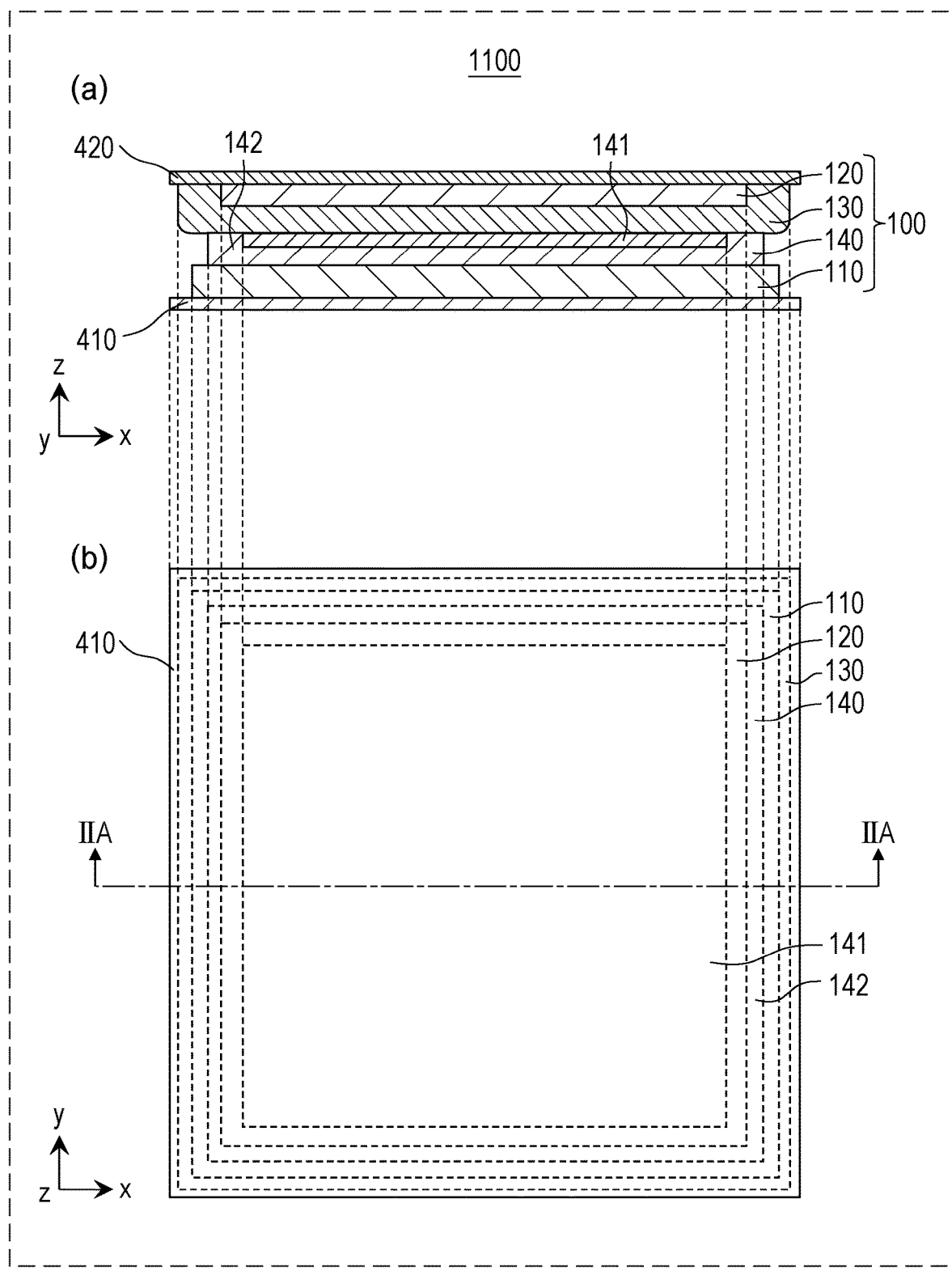
FIG. 2 shows, in outline, the configuration of a battery 1100 according to the first embodiment.

FIG. 2 shows, in outline, the configuration of a battery 1100 according to the first embodiment.

FIG. 2(a) is an x-z view (sectional view taken along line IIA-IIA) showing, in outline, the configuration of the battery 1100 according to the first embodiment.

FIG. 2(b) is an x-y view (top transparent view) showing, in outline, the configuration of the battery 1100 according to the first embodiment.

As shown in FIG. 2, if the first electrode layer 110 is a negative electrode layer, the first electrode layer 110 (negative electrode layer) may have a larger area than the first counter electrode layer 120 (positive electrode layer).

This configuration increases the area of the negative electrode layer so that the negative electrode layer has a higher charge-discharge capacity than the positive electrode layer. This allows less metallic lithium to be deposited on the negative electrode layer, thus improving the battery reliability.

As shown in FIG. 2, if the first electrode layer 110 is a negative electrode layer, the first electrode layer 110 (negative electrode layer) may have a larger thickness than the first counter electrode layer 120 (positive electrode layer).

This configuration increases the thickness of the negative electrode layer so that the negative electrode layer has a higher charge-discharge capacity than the positive electrode layer. This allows less metallic lithium to be deposited on the negative electrode layer, thus improving the battery reliability.

As shown in FIG. 2, the first solid electrolyte layer 130 may be formed over a larger area than at least one of the first heat-conducting layer 140 (first region 141), the first electrode layer 110, and the first counter electrode layer 120.

In this case, for example, as shown in FIG. 2, the first solid electrolyte layer 130 may be disposed such that it covers the first counter electrode layer 120.

If a piece of the first electrode layer 110 comes off upon an external impact or vibrations, this configuration prevents a short circuit between the first electrode layer 110 and the first counter electrode layer 120 through the piece of the first electrode layer 110 since the first solid electrolyte layer 130 covers the first counter electrode layer 120.

As shown in FIG. 2, the first heat-conducting layer 140 may be formed over a larger or smaller area than at least one of the first electrode layer 110 and the first solid electrolyte layer 130.

As shown in FIG. 2, the first region 141 may be in contact with the first solid electrolyte layer 130.

This configuration facilitates the propagation of heat between the first solid electrolyte layer 130 and the first region 141. This further reduces temperature nonuniformity (temperature variations) in the first solid electrolyte layer 130, which contains a solid electrolyte material (e.g., an inorganic solid electrolyte), which has low thermal conductivity and no flowability.

As shown in FIG. 2, the first region 141 may be formed over a smaller area and at a smaller thickness than the first heat-conducting layer 140. In this case, the first heat-conducting layer 140 includes a second region 142 different from the first region 141.

Alternatively, in the first embodiment, the first region 141 may be formed over the same area and at the same thickness as the first heat-conducting layer 140, as in the example shown in FIG. 3 below.

Figure 3:
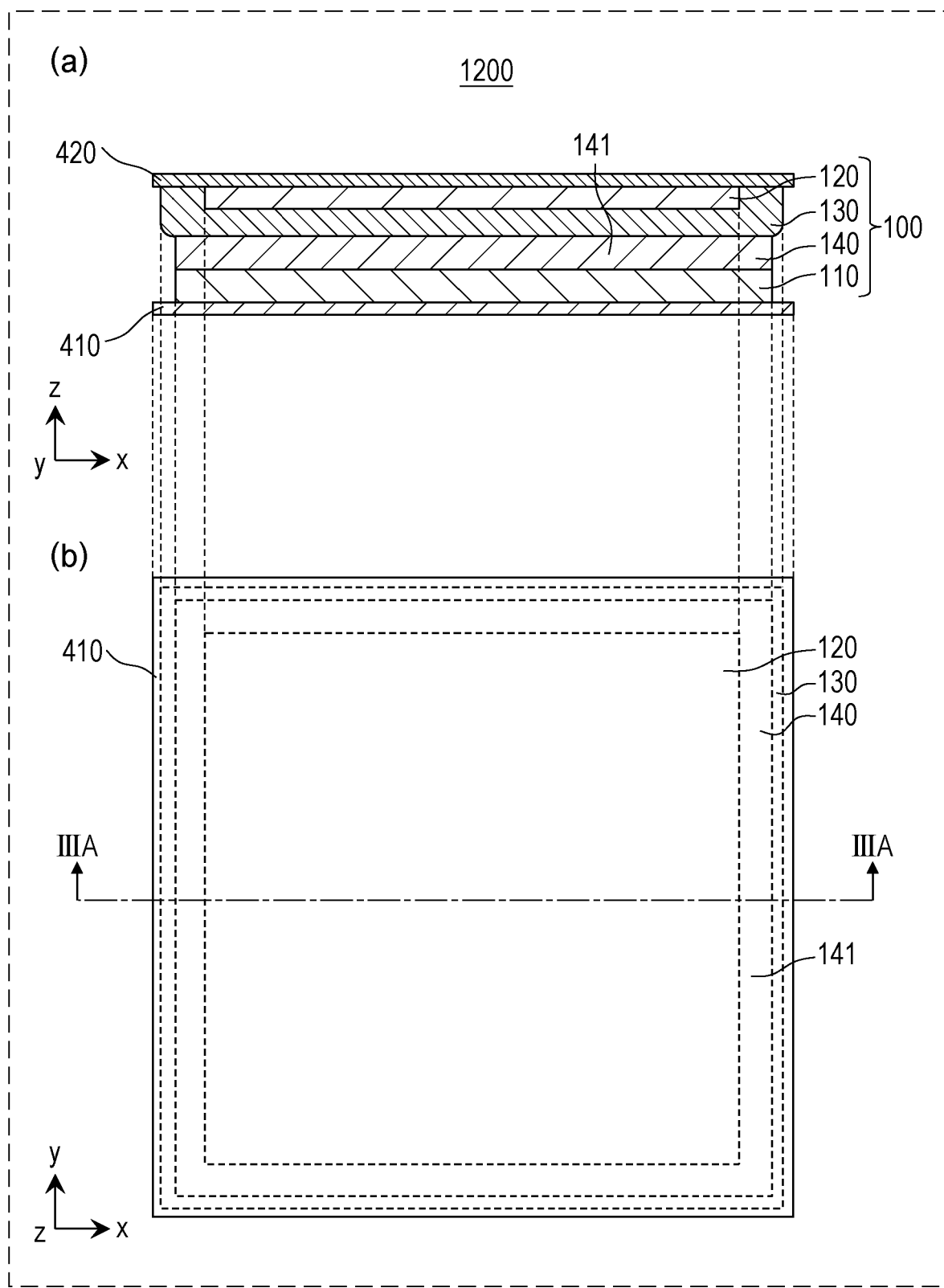
FIG. 3 shows, in outline, the configuration of a battery 1200 according to the first embodiment.

FIG. 3 shows, in outline, the configuration of a battery 1200 according to the first embodiment.

FIG. 3(a) is an x-z view (sectional view taken along line IIIA-IIIA) showing, in outline, the configuration of the battery 1200 according to the first embodiment.

FIG. 3(b) is an x-y view (top transparent view) showing, in outline, the configuration of the battery 1200 according to the first embodiment.

The first region 141 of the battery 1200 according to the first embodiment is located over the entire region where the first electrode layer 110 and the first solid electrolyte layer 130 face each other.

This configuration allows a heat-conducting material to be disposed over a large region (a region including the center and edges of the region where the first electrode layer 110 and the first solid electrolyte layer 130 face each other). This further reduces temperature nonuniformity (temperature variations) in the first solid electrolyte layer 130 through the first region 141 (i.e., the heat-conducting material disposed over the large region). Thus, a more uniform temperature can be maintained inside the battery. This further reduces variations in characteristics due to temperature variations at different sites inside the battery. As a result, the battery life can be further extended. In addition, Joule heat that can be generated at a site where an internal short circuit has occurred can propagate (diffuse) through the first region 141 disposed over the large region into the surrounding area. This further reduces a local temperature rise inside the battery. As a result, the battery reliability can be further improved.

In the first embodiment, the first region 141 may be disposed in a portion of the first heat-conducting layer 140, as in the examples shown in FIGS. 4 and 5 below.

Figure 4:
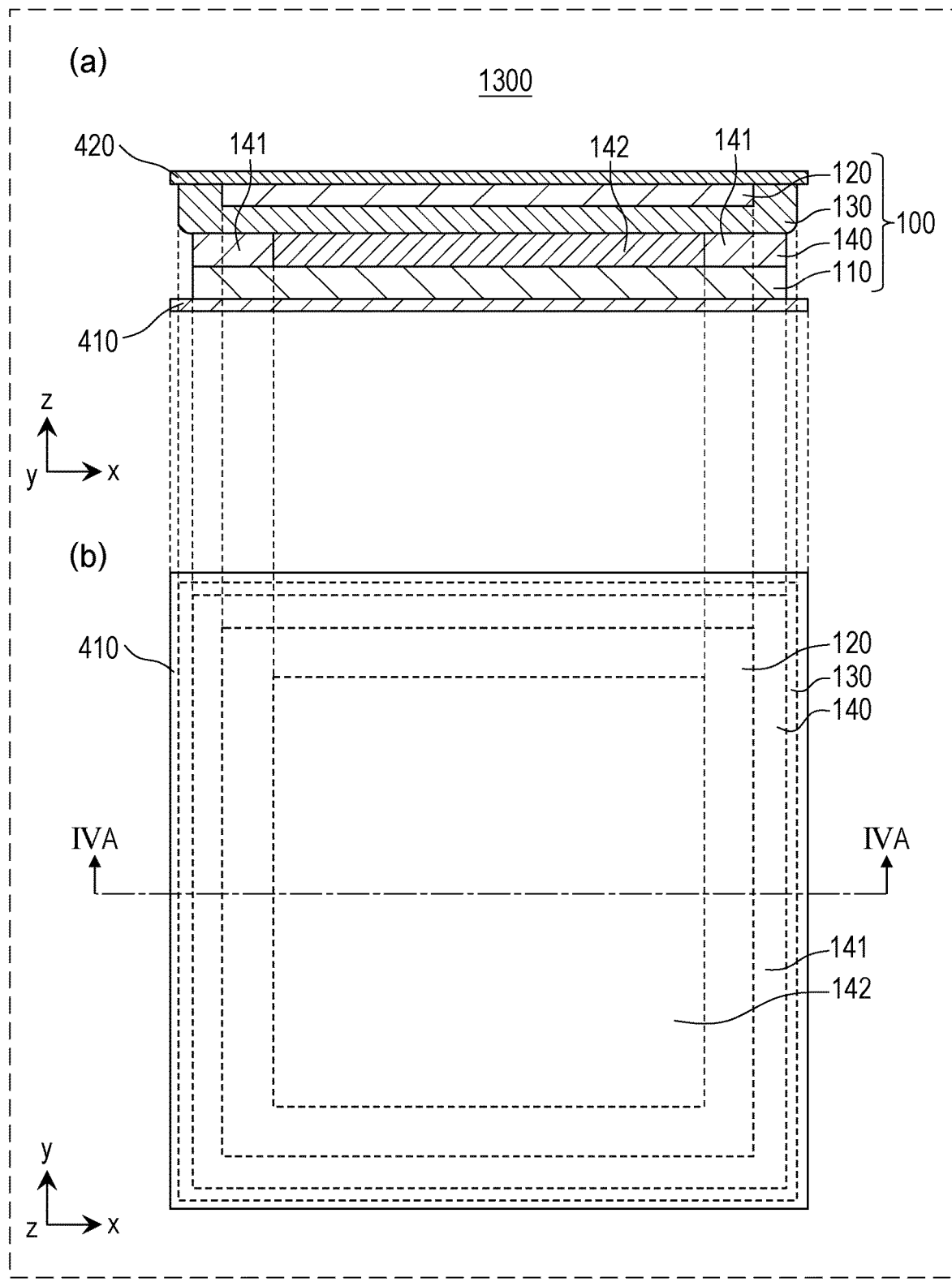
FIG. 4 shows, in outline, the configuration of a battery 1300 according to the first embodiment.

FIG. 4 shows, in outline, the configuration of a battery 1300 according to the first embodiment.

FIG. 4(a) is an x-z view (sectional view taken along line IVA-IVA) showing, in outline, the configuration of the battery 1300 according to the first embodiment.

FIG. 4(b) is an x-y view (top transparent view) showing, in outline, the configuration of the battery 1300 according to the first embodiment.

The first heat-conducting layer 140 of the battery 1300 according to the first embodiment includes a second region 142.

The second region 142 is different from the first region 141.

The first region 141 has a higher heat-conducting material concentration than the second region 142.

The first region 141 is located at the edges of the region where the first electrode layer 110 and the first solid electrolyte layer 130 face each other.

The second region 142 is located in the center of the region where the first electrode layer 110 and the first solid electrolyte layer 130 face each other.

This configuration allows a higher concentration of a heat-conducting material to be disposed at the edges, which are portions where more heat is generated by an increased load due to current concentration (e.g., portions where more heat is generated due to factors such as the deposition of metallic lithium). This further reduces temperature nonuniformity (temperature variations) in the first solid electrolyte layer 130 through the first region 141 (i.e., the higher concentration of the heat-conducting material) when heat is generated at the edges by an increased load due to current concentration. As a result, a battery with a longer life and a higher reliability can be provided.

This configuration also allows the second region 142, which has a lower heat-conducting material concentration, to be disposed in the center of the region where the first electrode layer 110 and the first solid electrolyte layer 130 face each other. Specifically, the heat-conducting material concentration can be reduced in the center of the region where the first electrode layer 110 and the first solid electrolyte layer 130 face each other. Thus, the magnitude of the decrease in ionic conductivity due to the presence of the heat-conducting material can be reduced in the center of the region where the first electrode layer 110 and the first solid electrolyte layer 130 face each other. As a result, the internal resistance of the battery can be further reduced, and better battery characteristics (e.g., better charge-discharge characteristics) can be achieved. For example, the area of the region where the ionic conductivity is lower can be reduced as compared to a configuration in which the first region 141 is disposed over the entire region where the first electrode layer 110 and the first solid electrolyte layer 130 face each other (e.g., the configuration in FIG. 3 described above). Thus, the power characteristics of the battery can be improved.

In the first embodiment, as shown in FIG. 4, the first region 141 may be located at all edges (e.g., all of the four edges) of the region where the first electrode layer 110 and the first solid electrolyte layer 130 face each other.

Alternatively, in the first embodiment, the first region 141 may be located at some edges (e.g., at least one of the four edges) of the region where the first electrode layer 110 and the first solid electrolyte layer 130 face each other.

The first region 141 of the battery 1300 according to the first embodiment may contain a solid electrolyte material. In this case, the weight percentage of the heat-conducting material relative to that of the solid electrolyte material in the first region 141 may increase gradually from the inside to the periphery of the stacking plane of the individual layers (i.e., from center to edge).

This configuration improves the ionic conductivity and thermal conductivity of the first region 141.

The second region 142 of the battery 1300 according to the first embodiment may be free of heat-conducting materials.

Figure 5:
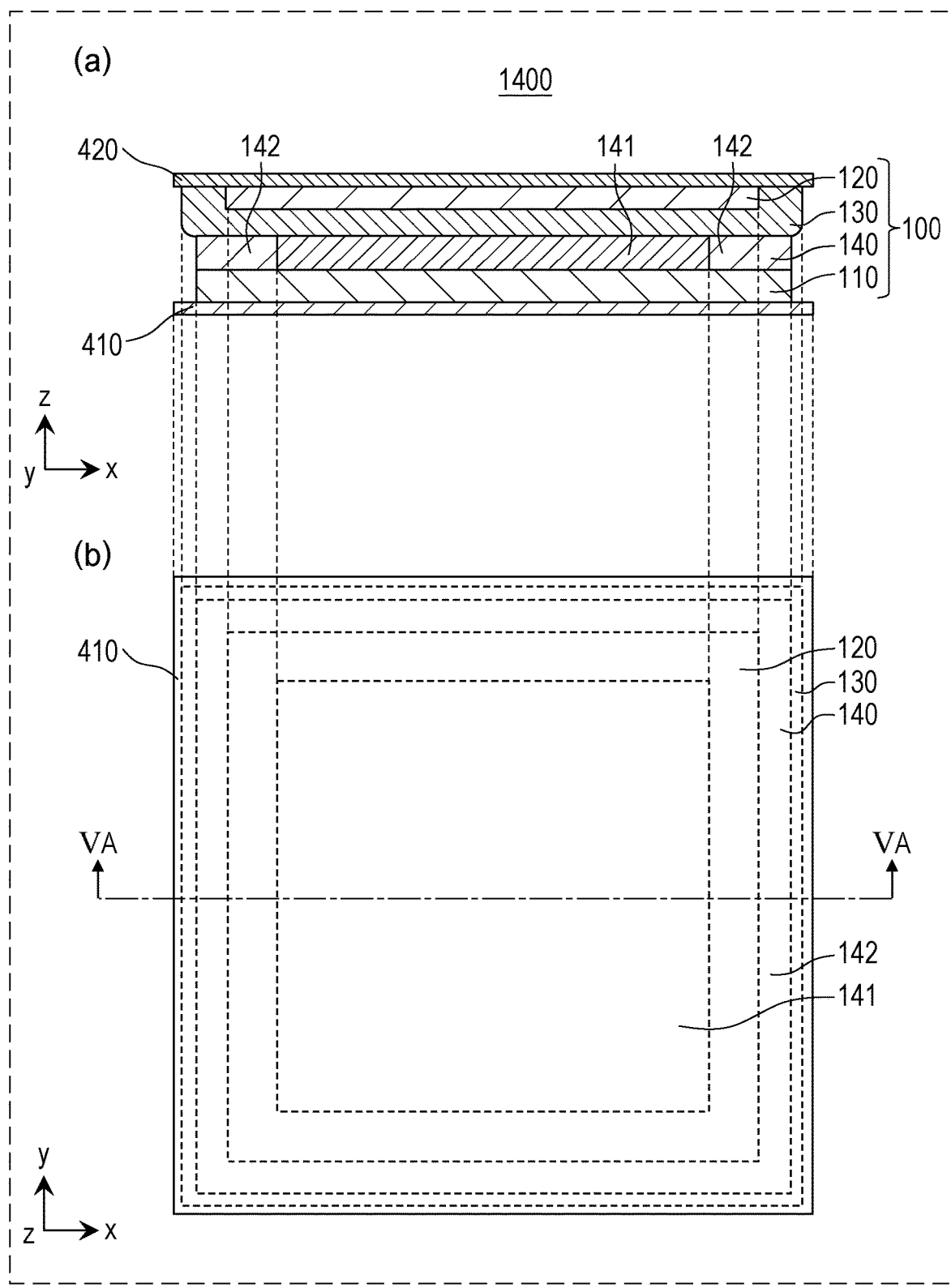
FIG. 5 shows, in outline, the configuration of a battery 1400 according to the first embodiment.

FIG. 5 shows, in outline, the configuration of a battery 1400 according to the first embodiment.

FIG. 5(a) is an x-z view (sectional view taken along line VA-VA) showing, in outline, the configuration of the battery 1400 according to the first embodiment.

FIG. 5(b) is an x-y view (top transparent view) showing, in outline, the configuration of the battery 1400 according to the first embodiment.

The first heat-conducting layer 140 of the battery 1400 according to the first embodiment includes a second region 142.

The second region 142 is different from the first region 141.

The first region 141 has a higher heat-conducting material concentration than the second region 142.

The first region 141 is located in the center of the region where the first electrode layer 110 and the first solid electrolyte layer 130 face each other.

The second region 142 is located at the edges of the region where the first electrode layer 110 and the first solid electrolyte layer 130 face each other.

This configuration allows a higher concentration of a heat-conducting material to be disposed in the center, which is a portion where more heat accumulates (i.e., a portion from which less heat dissipates outside the battery because of its distance from the periphery of the battery). This allows more heat to dissipate from the center of the battery (e.g., from the center of the first solid electrolyte layer 130) outside the battery through the first region 141 (i.e., the higher concentration of the heat-conducting material), thus further reducing temperature nonuniformity (temperature variations) in the first solid electrolyte layer 130. As a result, a battery with a longer life and a higher reliability can be provided.

This configuration also allows the second region 142, which has a lower heat-conducting material concentration, to be disposed at the edges of the region where the first electrode layer 110 and the first solid electrolyte layer 130 face each other. Specifically, the heat-conducting material concentration can be reduced at the edges of the region where the first electrode layer 110 and the first solid electrolyte layer 130 face each other. Thus, the magnitude of the decrease in ionic conductivity due to the presence of the heat-conducting material can be reduced at the edges of the region where the first electrode layer 110 and the first solid electrolyte layer 130 face each other. As a result, the internal resistance of the battery can be further reduced, and better battery characteristics (e.g., better charge-discharge characteristics) can be achieved. For example, the area of the region where the ionic conductivity is lower can be reduced as compared to a configuration in which the first region 141 is disposed over the entire region where the first electrode layer 110 and the first solid electrolyte layer 130 face each other (e.g., the configuration in FIG. 3 described above). Thus, the power characteristics of the battery can be improved.

The first region 141 of the battery 1400 according to the first embodiment may contain a solid electrolyte material. In this case, the weight percentage of the heat-conducting material relative to that of the solid electrolyte material in the first region 141 may increase gradually from the periphery to the inside of the stacking plane of the individual layers (i.e., from edge to center).

This configuration improves the ionic conductivity and thermal conductivity of the first region 141.

The second region 142 of the battery 1400 according to the first embodiment may be free of heat-conducting materials.

The second regions 142 of the batteries 1300 and 1400 according to the first embodiment may contain a solid electrolyte material.

This configuration improves the ionic conductivity of the second region 142 of the first heat-conducting layer 140. Specifically, ions can be transferred between the first electrode layer 110 (e.g., an active material layer) and the first solid electrolyte layer 130 through the solid electrolyte material present in the second region 142 of the first heat-conducting layer 140. As a result, the internal resistance of the battery can be further reduced, and better battery characteristics (e.g., better charge-discharge characteristics) can be achieved. For example, the power density of the battery can be improved.

In the first embodiment, the second region 142 and the first solid electrolyte layer 130 may contain the same solid electrolyte material or different solid electrolyte materials.

The second regions 142 of the batteries 1300 and 1400 according to the first embodiment may contain the first electrode material.

This configuration increases the amount of the first electrode material present in the battery. Specifically, both the first electrode material present in the first electrode layer 110 and the first electrode material present in the second region 142 of the first heat-conducting layer 140 can be used for the charge and discharge of the battery. As a result, the energy density of the battery can be improved.

Figure 6:
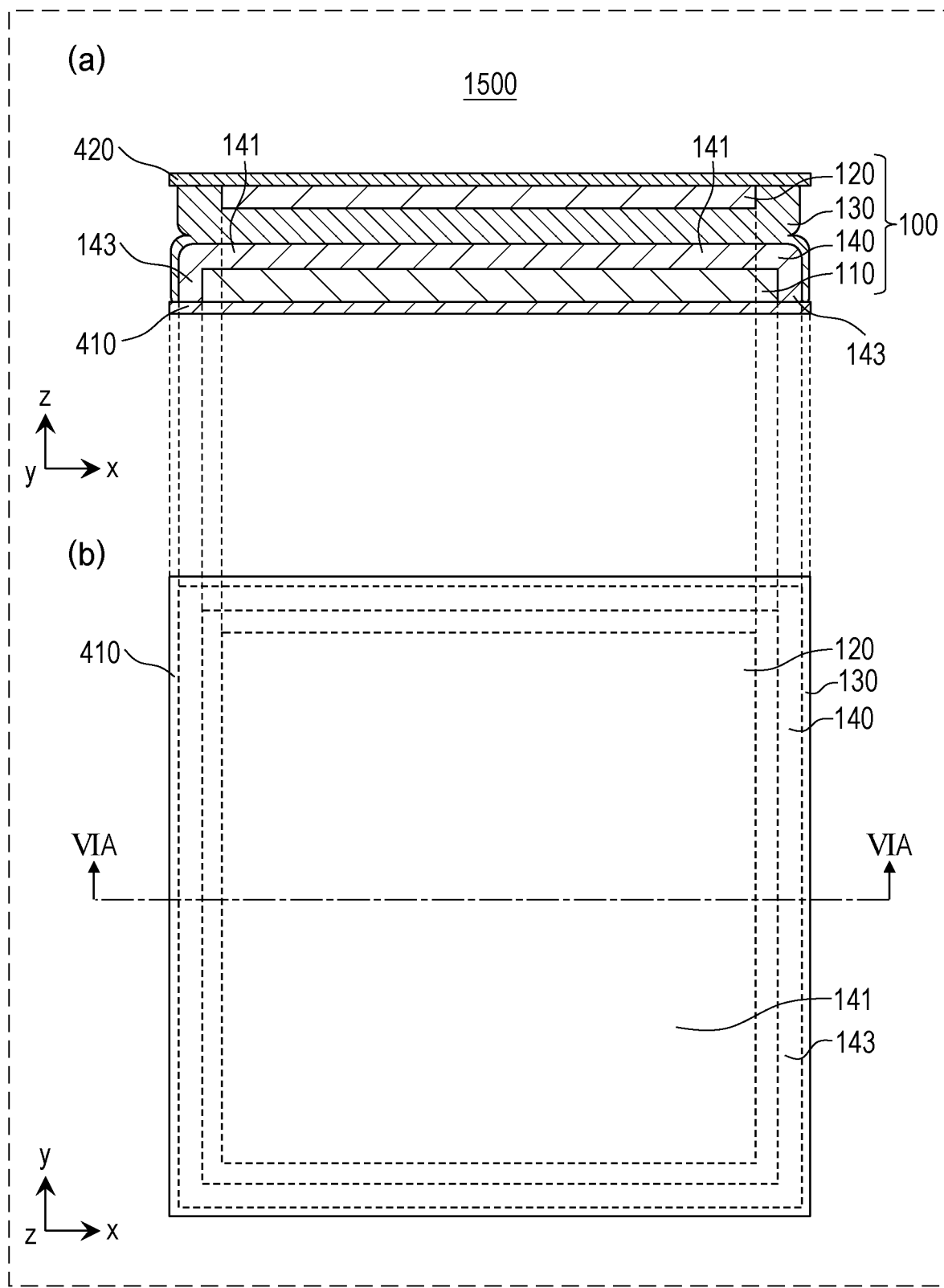
FIG. 6 shows, in outline, the configuration of a battery 1500 according to the first embodiment.

FIG. 6 shows, in outline, the configuration of a battery 1500 according to the first embodiment.

FIG. 6(a) is an x-z view (sectional view taken along line VIA-VIA) showing, in outline, the configuration of the battery 1500 according to the first embodiment.

FIG. 6(b) is an x-y view (top transparent view) showing, in outline, the configuration of the battery 1500 according to the first embodiment.

In addition to the configuration of the battery 1200 according to the first embodiment described above, the battery 1500 according to the first embodiment further includes the following configuration.

Specifically, the first heat-conducting layer 140 of the battery 1500 according to the first embodiment includes a third region 143.

The third region 143 contains a heat-conducting material.

The third region 143 covers the ends (e.g., the side surfaces) of the first electrode layer 110.

This configuration improves the heat dissipation performance of the first electrode layer 110 at the ends (e.g., the side surfaces), which are portions where more heat is generated by an increased load due to current concentration. Specifically, heat generated at the ends (e.g., the side surfaces) of the first electrode layer 110 can be diffused through the heat-conducting material present in the third region 143. This further reduces temperature nonuniformity (temperature variations) in the first electrode layer 110 and the first solid electrolyte layer 130. As a result, a battery with a longer life and a higher reliability can be provided.

As shown in FIG. 6, the battery 1500 according to the first embodiment may further include a first current collector layer 410.

The first current collector layer 410 includes a current collector electrically connected to the first electrode layer 110.

In this case, the third region 143 may be in contact with the first current collector layer 410.

This configuration allows heat to propagate (diffuse) from the third region 143 of the first heat-conducting layer 140 into the first current collector layer 410, which has high heat dissipation performance. This improves the heat dissipation performance of the first heat-conducting layer 140 and thus further reduces temperature nonuniformity (temperature variations) in the first electrode layer 110 and the first solid electrolyte layer 130. As a result, a battery with a longer life and a higher reliability can be provided.

Figure 7:
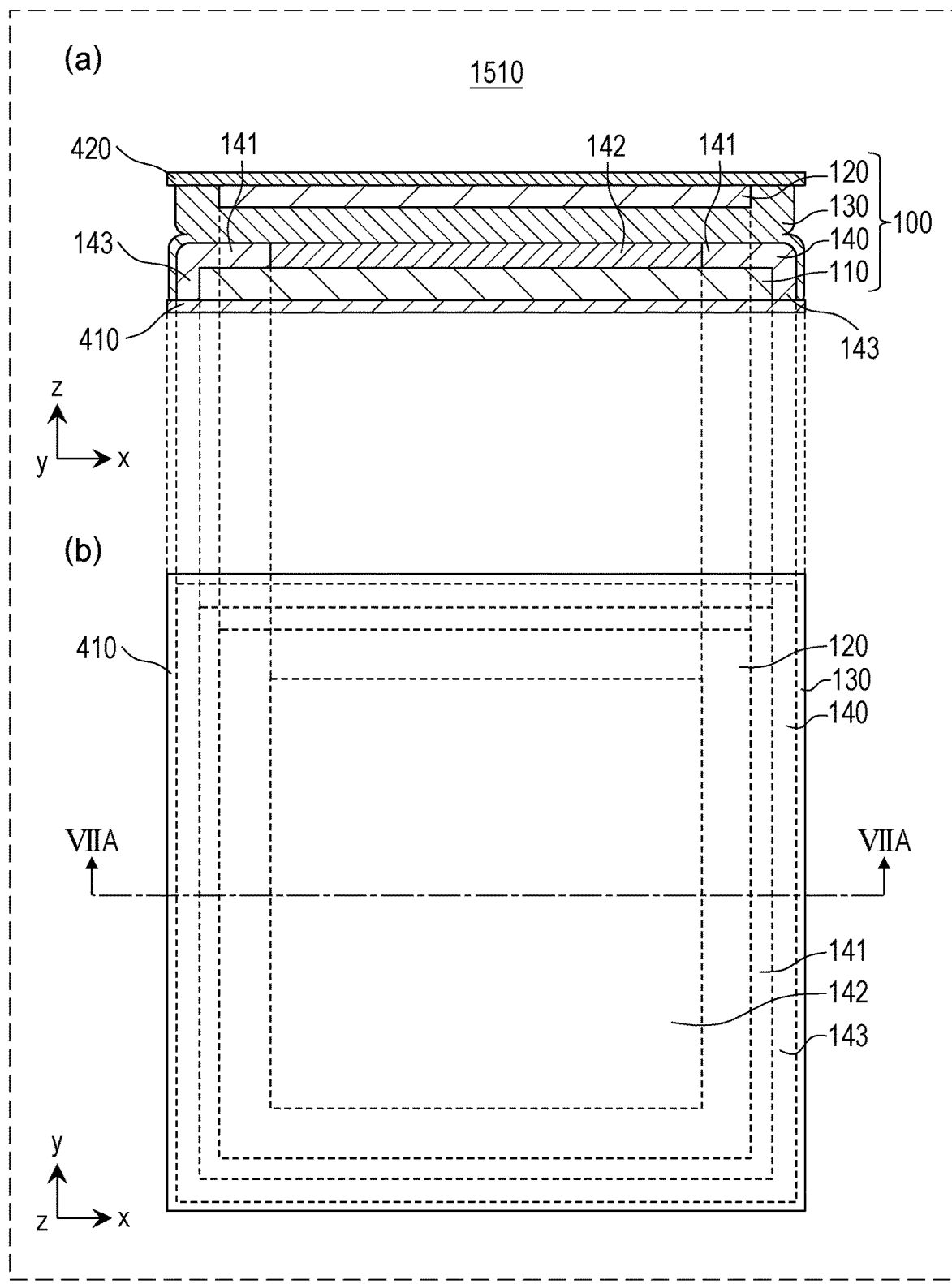
FIG. 7 shows, in outline, the configuration of a battery 1510 according to the first embodiment.

FIG. 7 shows, in outline, the configuration of a battery 1510 according to the first embodiment.

FIG. 7(a) is an x-z view (sectional view taken along line VIIA-VIIA) showing, in outline, the configuration of the battery 1510 according to the first embodiment.

FIG. 7(b) is an x-y view (top transparent view) showing, in outline, the configuration of the battery 1510 according to the first embodiment.

In addition to the configuration of the battery 1500 according to the first embodiment described above, the battery 1510 according to the first embodiment includes the configuration of the battery 1300 according to the first embodiment described above.

Specifically, the first heat-conducting layer 140 of the battery 1510 according to the first embodiment includes the first region 141 and the second region 142 shown in the battery 1300 as well as the third region 143.

In addition to the advantages offered by the battery 1300 described above, this configuration provides the advantage offered by the third region 143 described above. Specifically, the heat dissipation performance can be further improved at the edges (e.g., near the ends of the first electrode layer 110), which are portions where more heat is generated by an increased load due to current concentration, while the area of the region where the ionic conductivity is lower is reduced.

Figure 8:
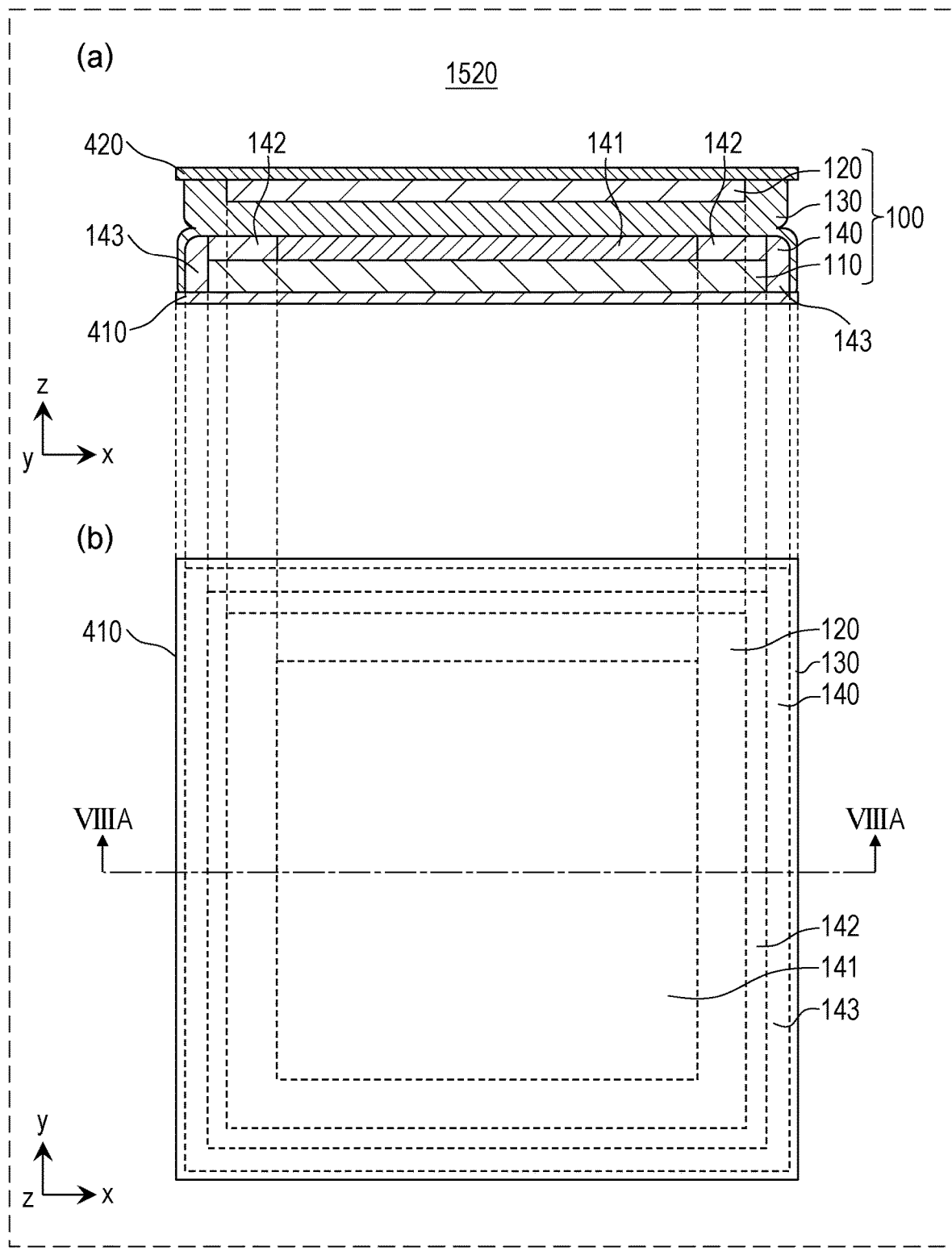
FIG. 8 shows, in outline, the configuration of a battery 1520 according to the first embodiment.

FIG. 8 shows, in outline, the configuration of a battery 1520 according to the first embodiment.

FIG. 8(a) is an x-z view (sectional view taken along line VIIIA-VIIIA) showing, in outline, the configuration of the battery 1520 according to the first embodiment.

FIG. 8(b) is an x-y view (top transparent view) showing, in outline, the configuration of the battery 1520 according to the first embodiment.

In addition to the configuration of the battery 1500 according to the first embodiment described above, the battery 1520 according to the first embodiment includes the configuration of the battery 1400 according to the first embodiment described above.

Specifically, the first heat-conducting layer 140 of the battery 1520 according to the first embodiment includes the first region 141 and the second region 142 shown in the battery 1400 as well as the third region 143.

In addition to the advantages offered by the battery 1400 described above, this configuration provides the advantage offered by the third region 143 described above. Specifically, the heat dissipation performance of the battery can be further improved in the center (e.g., in the center of the first solid electrolyte layer 130) and at the edges (e.g., near the ends of the first electrode layer 110), which are portions where more heat is generated by an increased load due to current concentration, while the area of the region where the ionic conductivity is lower is reduced.

In the first embodiment, as shown in FIGS. 6, 7, and 8, the first solid electrolyte layer 130 may cover the first heat-conducting layer 140.

If a piece of the first counter electrode layer 120 comes off upon an external impact or vibrations, this configuration prevents a short circuit between the first electrode layer 110 and the first counter electrode layer 120 through the piece of the first counter electrode layer 120 since the first solid electrolyte layer 130 covers the first heat-conducting layer 140.

In the first embodiment, as shown in FIGS. 6, 7, and 8, the first solid electrolyte layer 130 may cover the first heat-conducting layer 140 and the first counter electrode layer 120.

This configuration prevents a short circuit between the first electrode layer 110 and the first counter electrode layer 120 more firmly.

In the first embodiment, if the first electrode layer 110 is a positive electrode layer, the first heat-conducting layer 140 may be disposed between the positive electrode layer and the solid electrolyte layer. The positive electrode layer has a lower heat dissipation performance than the negative electrode layer; therefore, if the first heat-conducting layer 140 is located between the positive electrode layer and the solid electrolyte layer, heat generated on the positive electrode layer side can propagate more efficiently through the first heat-conducting layer 140 into the surrounding area.

In the first embodiment, if the first electrode layer 110 is the negative electrode layer, the first heat-conducting layer 140 may be disposed between the negative electrode layer and the solid electrolyte layer. When a battery becomes overloaded, for example, during high-current charge, metallic lithium is deposited on the negative electrode layer, which leads to an internal short circuit. An internal short circuit generates Joule heat and causes a local temperature rise, thus decreasing the battery reliability. If the first heat-conducting layer 140 is located between the negative electrode layer and the solid electrolyte layer, the first heat-conducting layer 140 reduces a local temperature rise on the negative electrode layer side, thus improving the battery reliability.

Second Embodiment

A second embodiment will now be described. A duplicate description of the first embodiment described above is omitted if appropriate.

Figure 9:
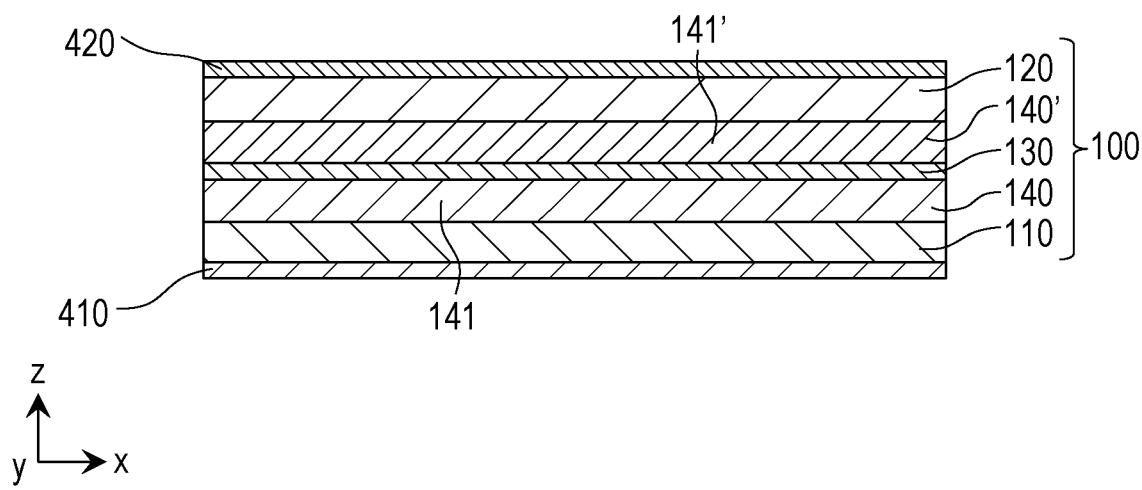
FIG. 9 is an x-z view (sectional view) showing, in outline, the configuration of a battery 2000 according to a second embodiment.

FIG. 9 is an x-z view (sectional view) showing, in outline, the configuration of a battery 2000 according to the second embodiment.

In addition to the configuration of the first embodiment described above, the battery 2000 according to the second embodiment further includes the following configuration.

Specifically, the battery 2000 according to the second embodiment further includes a first-counter-electrode-side heat-conducting layer 140'.

The first-counter-electrode-side heat-conducting layer 140' contains a heat-conducting material.

The first-counter-electrode-side heat-conducting layer 140' is located between the first counter electrode layer 120 and the first solid electrolyte layer 130.

This configuration further reduces temperature nonuniformity (temperature variations) in the first solid electrolyte layer 130 through the first-counter-electrode-side heat-conducting layer 140' as well as the first heat-conducting layer 140. In addition, a heat-conducting material can be disposed on each of the first electrode layer 110 side and the first counter electrode layer 120 side. This reduces a local temperature rise on the negative electrode layer side while allowing heat generated on the positive electrode layer side, which has a lower heat dissipation performance, to propagate into the surrounding area.

In the second embodiment, as shown in FIG. 9, the first electrode layer 110, the first counter electrode layer 120, the first solid electrolyte layer 130, the first heat-conducting layer 140, and the first-counter-electrode-side heat-conducting layer 140' may be stacked on top of each other to form a first electricity-generating element 100.

In the second embodiment, the first-counter-electrode-side heat-conducting layer 140' and the first heat-conducting layer 140 may contain the same heat-conducting material or different heat-conducting materials.

In the second embodiment, the first-counter-electrode-side heat-conducting layer 140' may, if appropriate, have the same configuration (e.g., the same area and thickness) as the first heat-conducting layer 140 in the first embodiment.

In the second embodiment, the first-counter-electrode-side heat-conducting layer 140' includes a first region 141'. The first region 141' contains a heat-conducting material.

In this case, as shown in FIG. 9, the first region 141' of the first-counter-electrode-side heat-conducting layer 140' may be located over the entire region where the first counter electrode layer 120 and the first solid electrolyte layer 130 face each other.

This configuration allows a heat-conducting material to be disposed over a large region (a region including the center and edges of the region where the first counter electrode layer 120 and the first solid electrolyte layer 130 face each other). This further reduces temperature nonuniformity (temperature variations) in the first solid electrolyte layer 130 through the first region 141' (i.e., the heat-conducting material disposed over the large region).

Figure 10:
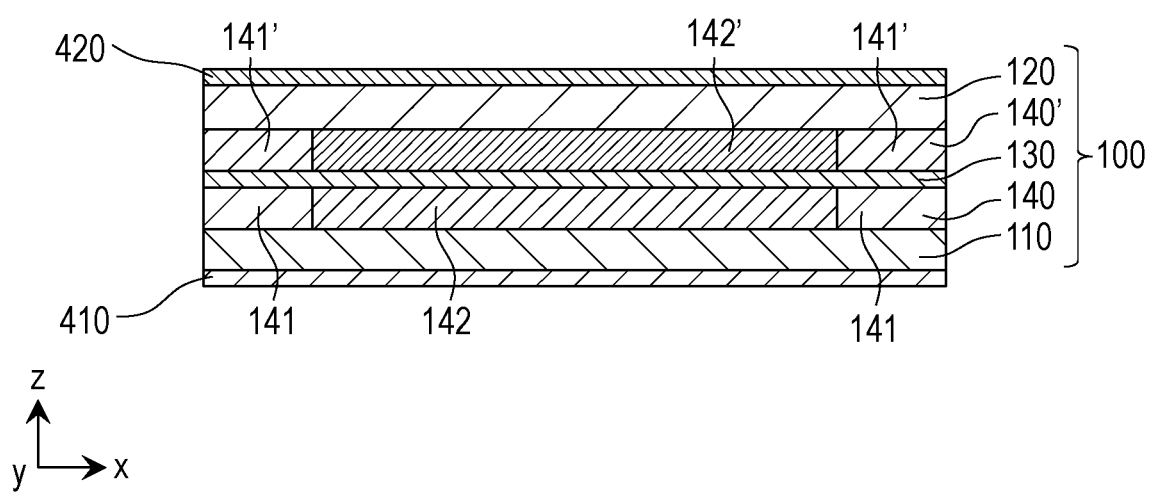
FIG. 10 is an x-z view (sectional view) showing, in outline, the configuration of a battery 2100 according to the second embodiment.

FIG. 10 is an x-z view (sectional view) showing, in outline, the configuration of a battery 2100 according to the second embodiment.

In the second embodiment, as shown in FIG. 10, the first-counter-electrode-side heat-conducting layer 140' may include a second region 142'. The second region 142' is different from the first region 141'.

In this case, the first region 141' of the first-counter-electrode-side heat-conducting layer 140' may have a higher heat-conducting material concentration than the second region 142' of the first-counter-electrode-side heat-conducting layer 140'.

In addition, the first region 141' of the first-counter-electrode-side heat-conducting layer 140' may be located at the edges of the region where the first counter electrode layer 120 and the first solid electrolyte layer 130 face each other.

In addition, the second region 142' of the first-counter-electrode-side heat-conducting layer 140' may be located in the center of the region where the first counter electrode layer 120 and the first solid electrolyte layer 130 face each other.

This configuration allows a higher concentration of a heat-conducting material to be disposed at the edges, which are portions where more heat is generated by an increased load due to current concentration (e.g., portions where more heat is generated due to factors such as the deposition of metallic lithium). This further reduces temperature nonuniformity (temperature variations) in the first solid electrolyte layer 130 through the first region 141' (i.e., the higher concentration of the heat-conducting material) when heat is generated at the edges by an increased load due to current concentration. As a result, a battery with a longer life and a higher reliability can be provided.

This configuration also allows the second region 142', which has a lower heat-conducting material concentration, to be disposed in the center of the region where the first counter electrode layer 120 and the first solid electrolyte layer 130 face each other. Specifically, the heat-conducting material concentration can be reduced in the center of the region where the first counter electrode layer 120 and the first solid electrolyte layer 130 face each other. Thus, the magnitude of the decrease in ionic conductivity due to the presence of the heat-conducting material can be reduced in the center of the region where the first counter electrode layer 120 and the first solid electrolyte layer 130 face each other. As a result, the internal resistance of the battery can be further reduced, and better battery characteristics (e.g., better charge-discharge characteristics) can be achieved.

Figure 11:
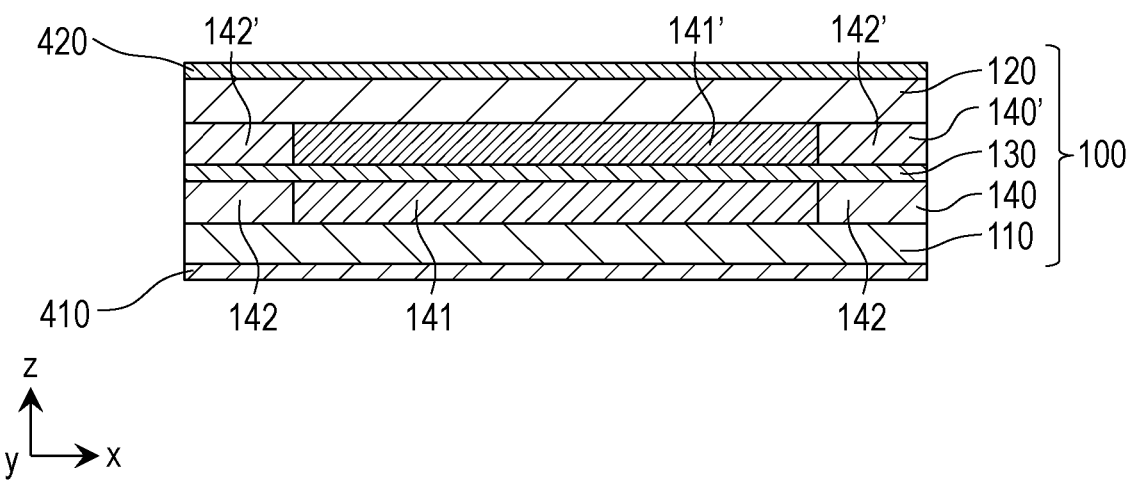
FIG. 11 is an x-z view (sectional view) showing, in outline, the configuration of a battery 2200 according to the second embodiment.

FIG. 11 is an x-z view (sectional view) showing, in outline, the configuration of a battery 2200 according to the second embodiment.

In the second embodiment, as shown in FIG. 11, the first region 141' of the first-counter-electrode-side heat-conducting layer 140' may be located in the center of the region where the first counter electrode layer 120 and the first solid electrolyte layer 130 face each other.

In addition, the second region 142' of the first-counter-electrode-side heat-conducting layer 140' may be located at the edges of the region where the first counter electrode layer 120 and the first solid electrolyte layer 130 face each other.

This configuration allows a higher concentration of a heat-conducting material to be disposed in the center, which is a portion where more heat accumulates (i.e., a portion from which less heat dissipates outside the battery because of its distance from the periphery of the battery). This allows more heat to dissipate from the center of the battery (e.g., from the center of the first solid electrolyte layer 130) outside the battery through the first region 141' (i.e., the higher concentration of the heat-conducting material), thus further reducing temperature nonuniformity (temperature variations) in the first solid electrolyte layer 130. As a result, a battery with a longer life and a higher reliability can be provided.

This configuration also allows the second region 142', which has a lower heat-conducting material concentration, to be disposed at the edges of the region where the first counter electrode layer 120 and the first solid electrolyte layer 130 face each other. Specifically, the heat-conducting material concentration can be reduced at the edges of the region where the first counter electrode layer 120 and the first solid electrolyte layer 130 face each other. Thus, the magnitude of the decrease in ionic conductivity due to the presence of the heat-conducting material can be reduced at the edges of the region where the first counter electrode layer 120 and the first solid electrolyte layer 130 face each other. As a result, the internal resistance of the battery can be further reduced, and better battery characteristics (e.g., better charge-discharge characteristics) can be achieved.

Figure 12:
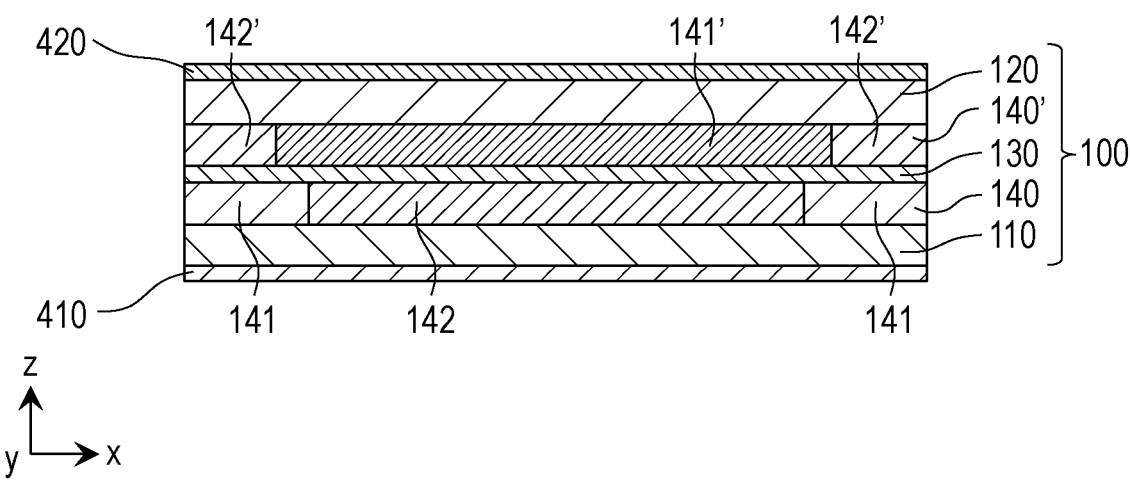
FIG. 12 is an x-z view (sectional view) showing, in outline, the configuration of a battery 2300 according to the second embodiment.

FIG. 12 is an x-z view (sectional view) showing, in outline, the configuration of a battery 2300 according to the second embodiment.

In the second embodiment, as shown in FIG. 12, the first region 141' of the first-counter-electrode-side heat-conducting layer 140' may be located in the center of the region where the first counter electrode layer 120 and the first solid electrolyte layer 130 face each other.

In addition, the second region 142' of the first-counter-electrode-side heat-conducting layer 140' may be located at the edges of the region where the first counter electrode layer 120 and the first solid electrolyte layer 130 face each other.

In addition, the first region 141 of the first heat-conducting layer 140 may be located at the edges of the region where the first electrode layer 110 and the first solid electrolyte layer 130 face each other.

In addition, the second region 142 of the first heat-conducting layer 140 may be located in the center of the region where the first electrode layer 110 and the first solid electrolyte layer 130 face each other.

This configuration improves the heat dissipation performance of the first solid electrolyte layer 130 at the edges through the first region 141 of the first heat-conducting layer 140 while improving the heat dissipation performance of the first solid electrolyte layer 130 in the center through the first region 141' of the first-counter-electrode-side heat-conducting layer 140'.

Figure 13:
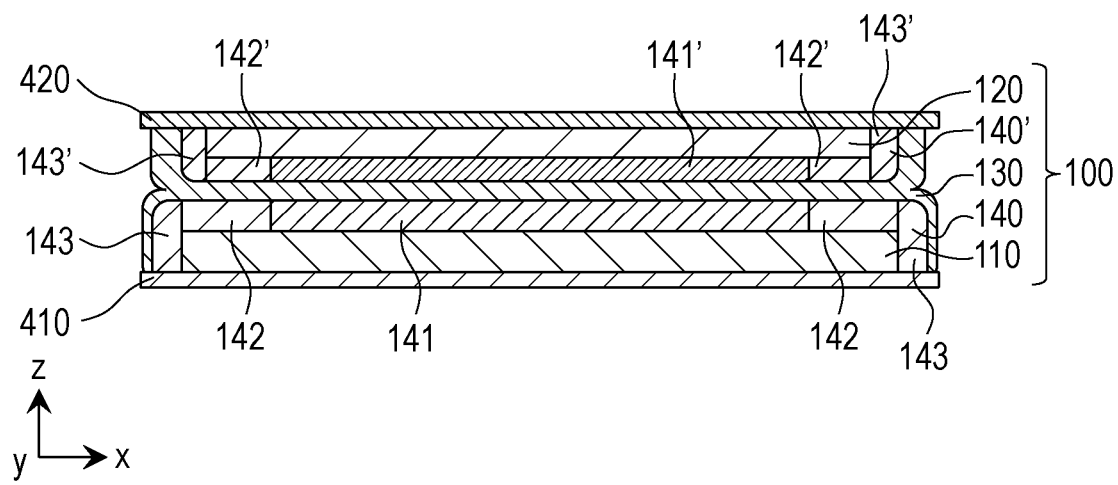
FIG. 13 is an x-z view (sectional view) showing, in outline, the configuration of a battery 2400 according to the second embodiment.

FIG. 13 is an x-z view (sectional view) showing, in outline, the configuration of a battery 2400 according to the second embodiment.

In addition to the configuration of any of the batteries 2000 to 2300 according to the second embodiment described above, the battery 2400 according to the second embodiment further includes the following configuration.

Specifically, the first-counter-electrode-side heat-conducting layer 140' of the battery 2400 according to the second embodiment covers the ends (e.g., the side surfaces) of the first counter electrode layer 120.

In other words, the first-counter-electrode-side heat-conducting layer 140' includes a third region 143'. The third region 143' contains a heat-conducting material. In this case, the third region 143' of the first-counter-electrode-side heat-conducting layer 140' covers the ends (e.g., the side surfaces) of the first counter electrode layer 120.

This configuration improves the heat dissipation performance of the first counter electrode layer 120 at the ends (e.g., the side surfaces), which are portions where more heat is generated by an increased load due to current concentration. Specifically, heat generated at the ends (e.g., the side surfaces) of the first counter electrode layer 120 can be diffused through the heat-conducting material present in the first-counter-electrode-side heat-conducting layer 140'. This further reduces temperature nonuniformity (temperature variations) in the first counter electrode layer 120 and the first solid electrolyte layer 130. As a result, a battery with a longer life and a higher reliability can be provided.

As shown in FIG. 13, the battery 2400 according to the second embodiment may further include a second current collector layer 420.

The second current collector layer 420 includes a current collector electrically connected to the first counter electrode layer 120.

In this case, the first-counter-electrode-side heat-conducting layer 140' may be in contact with the second current collector layer 420.

In other words, the third region 143' of the first-counter-electrode-side heat-conducting layer 140' may be in contact with the second current collector layer 420.

This configuration allows heat to propagate (diffuse) from the first-counter-electrode-side heat-conducting layer 140' into the second current collector layer 420, which has high heat dissipation performance. This improves the heat dissipation performance of the first-counter-electrode-side heat-conducting layer 140' and thus further reduces temperature nonuniformity (temperature variations) in the first counter electrode layer 120 and the first solid electrolyte layer 130. As a result, a battery with a longer life and a higher reliability can be provided.

In the second embodiment, as shown in FIG. 13, the first solid electrolyte layer 130 may cover the first-counter-electrode-side heat-conducting layer 140'.

If a piece of the first counter electrode layer 120 comes off upon an external impact or vibrations, this configuration prevents a short circuit between the first electrode layer 110 and the first counter electrode layer 120 through the piece of the first counter electrode layer 120 since the first solid electrolyte layer 130 covers the first-counter-electrode-side heat-conducting layer 140'.

Third Embodiment

A third embodiment will now be described. A duplicate description of the first or second embodiment described above is omitted if appropriate.

Figure 14:
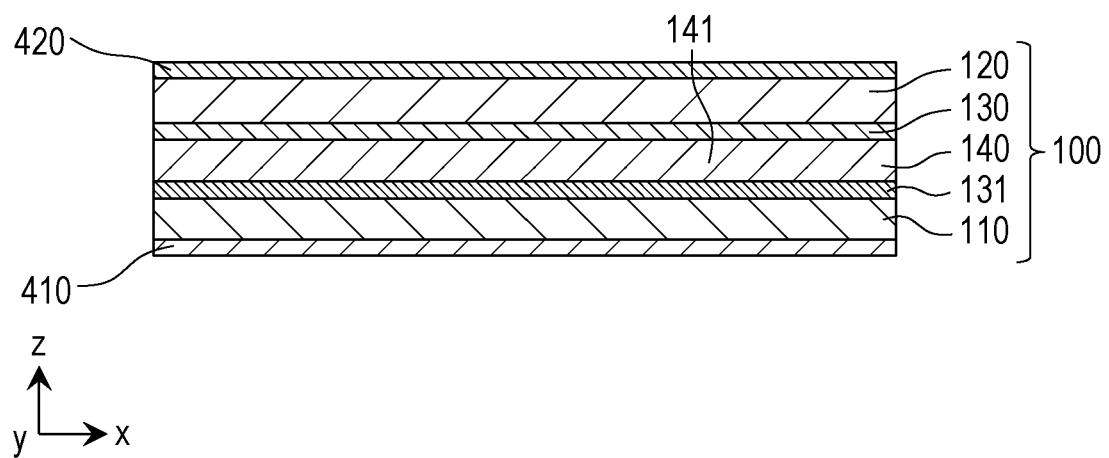
FIG. 14 is an x-z view (sectional view) showing, in outline, the configuration of a battery 3000 according to a third embodiment.

FIG. 14 is an x-z view (sectional view) showing, in outline, the configuration of a battery 3000 according to the third embodiment.

In addition to the configuration of the first or second embodiment described above, the battery 3000 according to the third embodiment further includes the following configuration.

Specifically, the battery 3000 according to the third embodiment further includes a first-electrode-side solid electrolyte layer 131.

The first-electrode-side solid electrolyte layer 131 contains a solid electrolyte material.

The first-electrode-side solid electrolyte layer 131 is located between the first electrode layer 110 and the first heat-conducting layer 140.

This configuration allows the first heat-conducting layer 140 to be disposed between two solid electrolyte layers (i.e., the first solid electrolyte layer 130 and the first-electrode-side solid electrolyte layer 131). This reduces side reactions between the heat-conducting material and the solid electrolyte material present in the first heat-conducting layer 140. As a result, the heat dissipation performance of the battery can be improved without degrading the power characteristics of the battery.

A more detailed description is given below. In the first heat-conducting layer 140, which contains an electronically conductive heat-conducting material, side reactions occur at the interface between the heat-conducting material and the solid electrolyte material as electrons are transferred. As a result, the resistance increases, thus decreasing the battery power. This transfer of electrons occurs because the first heat-conducting layer 140 is electronically connected to the current collector. For example, if the first heat-conducting layer 140 is in contact with an electronically conductive electrode layer (positive electrode layer or negative electrode layer), the first heat-conducting layer 140 is electronically connected to the current collector through the electrode layer, which leads to the transfer of electrons. In contrast, solid electrolyte materials have no electronic conductivity. Accordingly, two solid electrolyte layers having no electronic conductivity (i.e., the first solid electrolyte layer 130 and the first-electrode-side solid electrolyte layer 131) are disposed on either side of the first heat-conducting layer 140 to avoid direct contact of the first heat-conducting layer 140 with the first electrode layer 110 (or the first counter electrode layer 120). This reduces the transfer of electrons in the first heat-conducting layer 140 and thus reduces side reactions between the heat-conducting material and the solid electrolyte material in the first heat-conducting layer 140. As a result, the heat dissipation performance of the battery can be improved without degrading the power characteristics of the battery.

In the third embodiment, as shown in FIG. 14, the first electrode layer 110, the first counter electrode layer 120, the first solid electrolyte layer 130, the first heat-conducting layer 140, and the first-electrode-side solid electrolyte layer 131 may be stacked on top of each other to form a first electricity-generating element 100.

In the third embodiment, the first-electrode-side solid electrolyte layer 131 and the first solid electrolyte layer 130 may contain the same solid electrolyte material or different solid electrolyte materials.

In the third embodiment, the first-electrode-side solid electrolyte layer 131 may, if appropriate, have the same configuration (e.g., the same area and thickness) as the first solid electrolyte layer 130 in the first embodiment.

In the third embodiment, the first-electrode-side solid electrolyte layer 131 may contain an inorganic solid electrolyte material.

This configuration improves the ionic conductivity of the first-electrode-side solid electrolyte layer 131. In this case, the low thermal conductivity of the inorganic solid electrolyte material present in the first-electrode-side solid electrolyte layer 131 can be compensated for by the heat-conducting material present in the first region 141 of the first heat-conducting layer 140. Thus, the use of the first heat-conducting layer 140 in combination with a first-electrode-side solid electrolyte layer 131 containing an inorganic solid electrolyte material provides a battery with improved ionic conductivity and heat dissipation performance.

Figure 15:
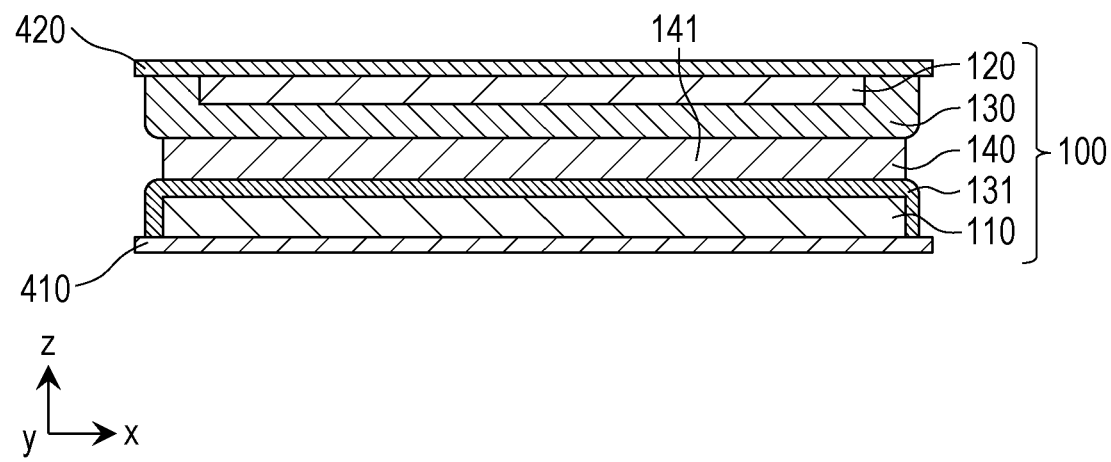
FIG. 15 is an x-z view (sectional view) showing, in outline, the configuration of a battery 3100 according to the third embodiment.

FIG. 15 is an x-z view (sectional view) showing, in outline, the configuration of a battery 3100 according to the third embodiment.

The first-electrode-side solid electrolyte layer 131 of the third embodiment may be added to the configuration of the battery 1200 according to the first embodiment described above to form the battery 3100 according to the third embodiment.

Figure 16:
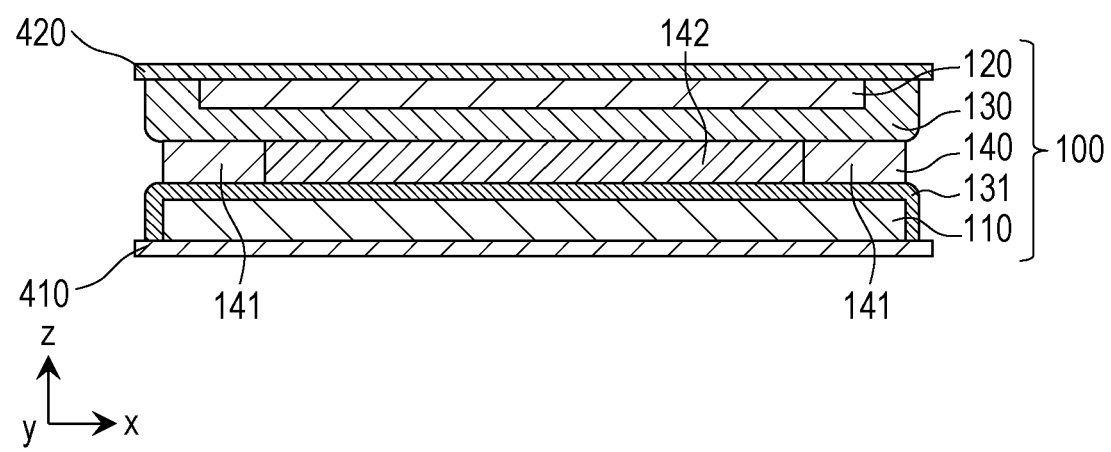
FIG. 16 is an x-z view (sectional view) showing, in outline, the configuration of a battery 3200 according to the third embodiment.

FIG. 16 is an x-z view (sectional view) showing, in outline, the configuration of a battery 3200 according to the third embodiment.

The first-electrode-side solid electrolyte layer 131 of the third embodiment may be added to the configuration of the battery 1300 according to the first embodiment described above to form the battery 3200 according to the third embodiment.

Figure 17:
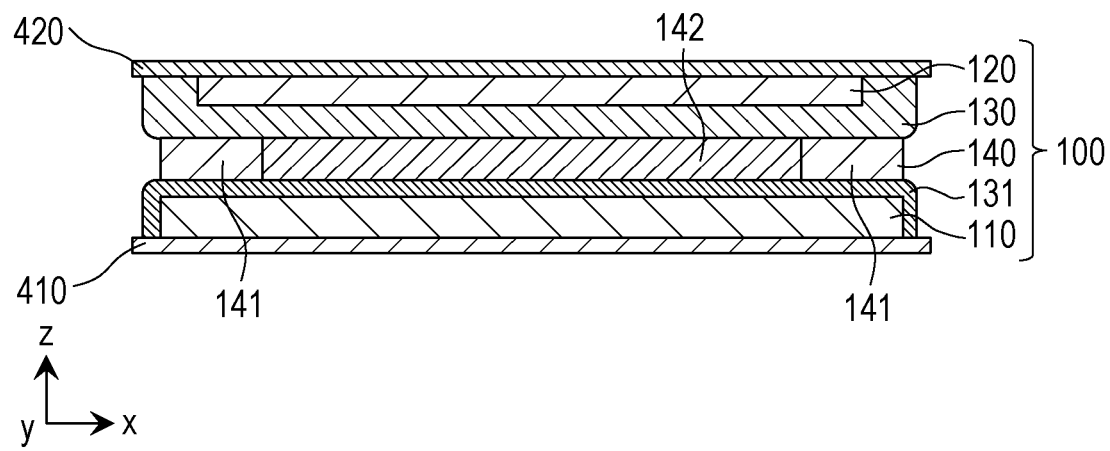
FIG. 17 is an x-z view (sectional view) showing, in outline, the configuration of a battery 3300 according to the third embodiment.

FIG. 17 is an x-z view (sectional view) showing, in outline, the configuration of a battery 3300 according to the third embodiment.

The first-electrode-side solid electrolyte layer 131 of the third embodiment may be added to the configuration of the battery 1400 according to the first embodiment described above to form the battery 3300 according to the third embodiment.

Figure 18:
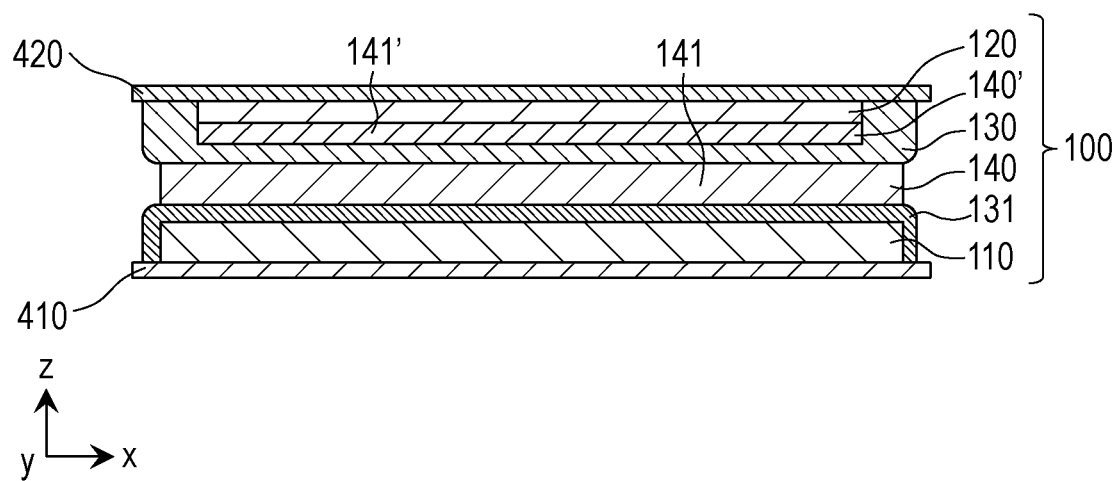
FIG. 18 is an x-z view (sectional view) showing, in outline, the configuration of a battery 3400 according to the third embodiment.

FIG. 18 is an x-z view (sectional view) showing, in outline, the configuration of a battery 3400 according to the third embodiment.

The first-counter-electrode-side heat-conducting layer 140' of the second embodiment may be added to the configuration of the battery 3100 according to the third embodiment described above to form the battery 3400 according to the third embodiment.

Method of Manufacture

An example method for manufacturing the batteries according to the first to third embodiments will now be described.

A positive electrode layer paste is prepared by mixing a positive electrode active material and a solid electrolyte with a solvent into a paste. A heat-conducting layer paste is prepared by mixing a solid electrolyte and a thermal conductor with a solvent into a paste. A negative electrode layer paste is prepared by mixing a negative electrode active material and a solid electrolyte with a solvent into a paste. A solid electrolyte layer paste is prepared by mixing a solid electrolyte with a solvent into a paste.

The negative electrode layer paste is applied to a negative electrode current collector. The negative electrode layer paste may be applied by printing techniques such as those using metal masks and screens. The solvent is removed with a hot-air dryer or vacuum dryer to obtain a negative electrode including a negative electrode layer formed on the negative electrode current collector. In this step, the negative electrode layer may be compressed under pressure by processes such as uniaxial pressing, roller pressing, and cold isostatic pressing (CIP) to improve the density of the negative electrode layer.

The heat-conducting layer paste is applied to the negative electrode. In this step, the heat-conducting layer paste may be applied over an area larger than the area of the negative electrode layer to fabricate a structure, such as the battery 1500 shown in FIG. 6, in which the first heat-conducting layer 140 covers the side surfaces of the negative electrode layer (in this example, the first electrode layer 110). The solvent is removed with a hot-air dryer or vacuum dryer to obtain a stack of the negative electrode layer and a heat-conducting layer formed on the negative electrode current collector. In this step, the stack may be compressed under pressure by processes such as uniaxial pressing, roller pressing, and CIP to improve the density.

The positive electrode layer paste is applied to a positive electrode current collector. The positive electrode layer paste may be applied by printing techniques such as those using metal masks and screens. The solvent is removed with a hot-air dryer or vacuum dryer to obtain a positive electrode including a positive electrode layer formed on the positive electrode current collector. In this step, the positive electrode layer may be compressed under pressure by processes such as uniaxial pressing, roller pressing, and CIP to improve the density of the positive electrode layer.

The solid electrolyte layer paste is applied to one or both of the stack of the negative electrode layer and the heat-conducting layer formed on the negative electrode current collector and the positive electrode including the positive electrode layer formed on the positive electrode current collector. In this step, the solid electrolyte layer paste may be applied over an area larger than the area of the stack of the negative electrode layer and the heat-conducting layer and the area of the positive electrode layer to fabricate a structure, such as the battery 1500 shown in FIG. 6, in which the first solid electrolyte layer 130 covers the side surfaces of the battery. The solvent is removed with a hot-air dryer or vacuum dryer to obtain a stack of the negative electrode layer, the heat-conducting layer, and a solid electrolyte layer formed on the negative electrode current collector and a stack of the positive electrode layer and a solid electrolyte layer formed on the positive electrode current collector. In this step, each stack may be compressed under pressure by processes such as uniaxial pressing, roller pressing, and CIP to improve the density.

The stack of the negative electrode layer, the heat-conducting layer, and the solid electrolyte layer formed on the negative electrode current collector and the stack of the positive electrode layer and the solid electrolyte layer formed on the positive electrode current collector are combined together. The two stacks are compressed under pressure by processes such as uniaxial pressing, roller pressing, and CIP to bond them together.

The above steps are performed to fabricate, for example, the battery 1000.

The batteries 1300 and 1400 according to the first embodiment, for example, are manufactured in the same manner as the battery 1000 except that the step of applying the heat-conducting layer paste differs. Specifically, the heat-conducting layer paste is applied to the positive electrode layer, the solid electrolyte layer, or the negative electrode layer through a metal mask or screen having an opening in the area where the heat-conducting layer paste is to be applied. The positive electrode layer paste, the solid electrolyte layer paste, or the negative electrode layer paste is then applied through a metal mask or screen having a mask portion in the area where the heat-conducting layer paste has been applied and an opening in the remaining area.

The battery 2000 according to the second embodiment is manufactured in the same manner as the battery 1000 except that the order of applying the pastes differs. Specifically, for example, the positive electrode layer paste, the heat-conducting layer paste, and the solid electrolyte layer paste are applied in the above order to the positive electrode current collector, whereas the negative electrode layer paste, the heat-conducting layer paste, and the solid electrolyte layer paste are applied in the above order to the negative electrode current collector. In this case, the solid electrolyte layer paste may be provided on one or both of the positive electrode stack and the negative electrode stack.

The battery 3000 according to the third embodiment is manufactured in the same manner as the battery 1000 except that the order of applying the pastes differs. Specifically, for example, the positive electrode layer paste, the solid electrolyte layer paste, and the heat-conducting layer paste are applied in the above order to the positive electrode current collector, whereas the negative electrode layer paste, the solid electrolyte layer paste, and the heat-conducting layer paste are applied in the above order to the negative electrode current collector. In this case, the heat-conducting layer paste may be provided on one or both of the positive electrode stack and the negative electrode stack.

Fourth Embodiment

A fourth embodiment will now be described. A duplicate description of any of the first to third embodiments described above is omitted if appropriate.

Figure 19:
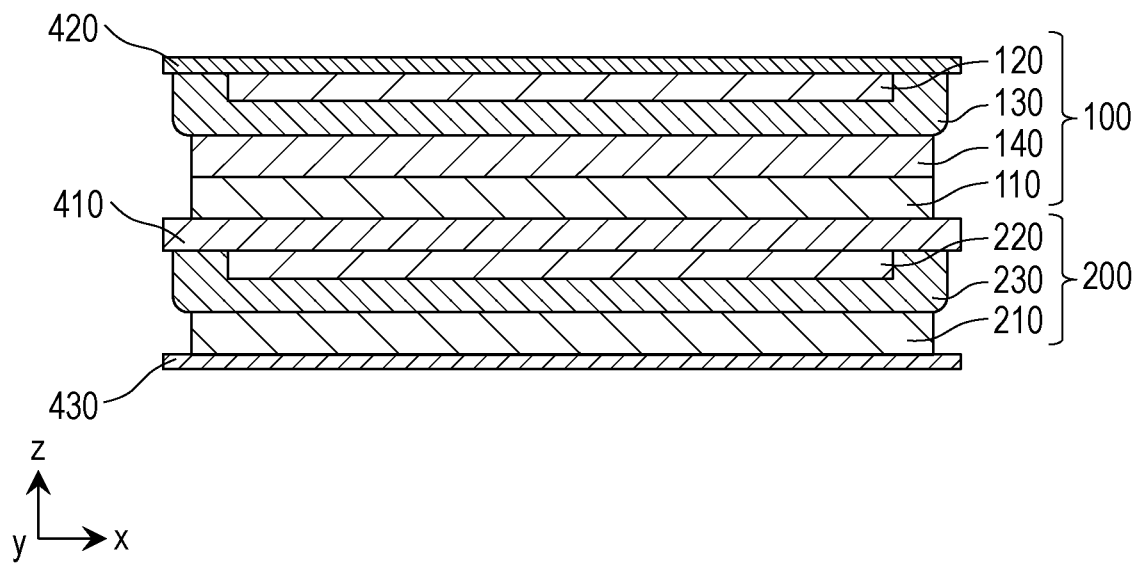
FIG. 19 is an x-z view (sectional view) showing, in outline, the configuration of a battery 4000 according to a fourth embodiment.

FIG. 19 is an x-z view (sectional view) showing, in outline, the configuration of a battery 4000 according to the fourth embodiment.

In addition to the configuration of any of the first to third embodiments described above, the battery 4000 according to the fourth embodiment further includes the following configuration.

Specifically, the battery 4000 according to the fourth embodiment further includes a second electrode layer 210, a second counter electrode layer 220, a second solid electrolyte layer 230, and a first current collector layer 410.

The second electrode layer 210 contains a second electrode material.

The second counter electrode layer 220 contains a second counter electrode material. The second counter electrode layer 220 serves as a counter electrode for the second electrode layer 210.

The second solid electrolyte layer 230 contains a solid electrolyte material. The second solid electrolyte layer 230 is located between the second electrode layer 210 and the second counter electrode layer 220.

The first current collector layer 410 includes a current collector electrically connected to the first electrode layer 110 and the second counter electrode layer 220.

The first electrode layer 110 and the second counter electrode layer 220 are stacked with the first current collector layer 410 therebetween.

This configuration allows a layer containing a heat-conducting material to be disposed in at least one electricity-generating element of a stacked battery including at least two electricity-generating elements. Specifically, the heat dissipation performance of a stacked battery composed of a stack of two or more electricity-generating elements (a battery in which more heat accumulates) can be improved through the first heat-conducting layer 140. Specifically, heat generated inside the stacked battery can be dissipated through the first heat-conducting layer 140 outside the battery. This allows the decrease in heat dissipation performance resulting from the increase in battery thickness due to the stacking of two or more electricity-generating elements to be compensated for by the heat dissipation performance of the first heat-conducting layer 140. As a result, a battery with a long life and high reliability can be provided.

In the fourth embodiment, as shown in FIG. 19, the second electrode layer 210, the second counter electrode layer 220, and the second solid electrolyte layer 230 may be stacked on top of each other to form a second electricity-generating element 200.

In the fourth embodiment, the layers of the second electricity-generating element 200 may, if appropriate, have the same configuration (e.g., the same area and thickness) as the layers of the first electricity-generating element 100 in the first to third embodiments.

In the fourth embodiment, the second solid electrolyte layer 230 and the first solid electrolyte layer 130 may contain the same solid electrolyte material or different solid electrolyte materials.

In the fourth embodiment, as shown in FIG. 19, a third current collector layer 430 may be disposed at one end of the second electricity-generating element 200.

That is, the battery 4000 according to the fourth embodiment may further include the third current collector layer 430.

The third current collector layer 430 includes a current collector electrically connected to (e.g., in direct contact with) the second electrode layer 210.

In the fourth embodiment, the first electrode layer 110 may be a positive electrode layer. In this case, the second electrode layer 210 may be a positive electrode layer. In this case, the second electrode material present in the second electrode layer 210 is a positive electrode material. In this case, the second counter electrode layer 220 is a negative electrode layer. In this case, the second counter electrode material present in the second counter electrode layer 220 is a negative electrode material. In this case, the third current collector layer 430 includes a positive electrode current collector.

Alternatively, in the fourth embodiment, the first electrode layer 110 may be a negative electrode layer. In this case, the second electrode layer 210 may be a negative electrode layer. In this case, the second electrode material present in the second electrode layer 210 is a negative electrode material. In this case, the second counter electrode layer 220 is a positive electrode layer. In this case, the second counter electrode material present in the second counter electrode layer 220 is a positive electrode material. In this case, the third current collector layer 430 includes a negative electrode current collector.

As described above, the first electrode layer 110 and the second electrode layer 210 may be of the same polarity so that a stacked battery in which the first electricity-generating element 100 and the second electricity-generating element 200 are connected in series can be constructed. Connecting a plurality of electricity-generating elements in series (connecting the positive electrode side of one electricity-generating element to the negative electrode side of another electricity-generating element adjacent thereto) increases the battery voltage.

In the fourth embodiment, as shown in FIG. 19, the first current collector layer 410 may be a bipolar current collector.

Bipolar current collectors are current collectors having a positive electrode layer on one side of a single current collector and a negative electrode layer on the opposite side thereof. Whereas two current collectors, i.e., positive and negative electrode current collectors, are conventionally required, a single bipolar current collector can be used instead. This reduces the number of current collectors. As a result, the energy density of the battery can be increased.

Alternatively, in the fourth embodiment, a plurality of electricity-generating elements may be connected in series using positive and negative electrode current collectors. Specifically, the first current collector layer 410 may be composed of a stack of positive and negative electrode current collectors.

This configuration does not include a current collector, such as a bipolar current collector, shared by two adjacent electricity-generating elements. This facilitates the separation and connection of electricity-generating elements, thus improving the manufacturing yield of batteries.

Figure 20:
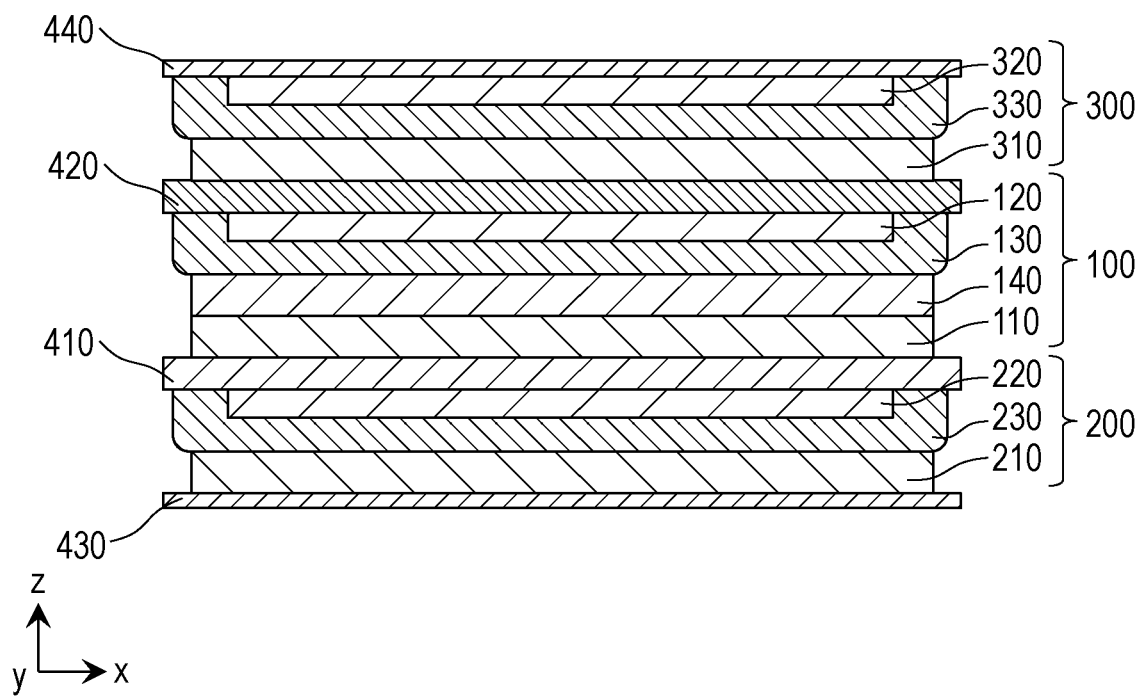
FIG. 20 is an x-z view (sectional view) showing, in outline, the configuration of a battery 4100 according to the fourth embodiment.

FIG. 20 is an x-z view (sectional view) showing, in outline, the configuration of a battery 4100 according to the fourth embodiment.

In addition to the configuration of the battery 4000 according to the fourth embodiment described above, the battery 4100 according to the fourth embodiment further includes the following configuration.

Specifically, the battery 4100 according to the fourth embodiment further includes a third electrode layer 310, a third counter electrode layer 320, a third solid electrolyte layer 330, and a second current collector layer 420.

The third electrode layer 310 contains a third electrode material.

The third counter electrode layer 320 contains a third counter electrode material. The third counter electrode layer 320 serves as a counter electrode for the third electrode layer 310.

The third solid electrolyte layer 330 contains a solid electrolyte material. The third solid electrolyte layer 330 is located between the third electrode layer 310 and the third counter electrode layer 320.

The second current collector layer 420 is electrically connected to the first counter electrode layer 120 and the third electrode layer 310.

The first counter electrode layer 120 and the third electrode layer 310 are stacked with the second current collector layer 420 therebetween.

This configuration allows a layer containing a heat-conducting material to be disposed in at least one electricity-generating element, other than those located at both ends, of a stacked battery including at least three electricity-generating elements. Specifically, the heat dissipation performance of a stacked battery composed of a stack of three or more electricity-generating elements (a battery in which more heat accumulates) can be improved through the first heat-conducting layer 140. Specifically, heat generated inside the stacked battery can be dissipated through the first heat-conducting layer 140 outside the battery. This allows the decrease in heat dissipation performance resulting from the increase in battery thickness due to the stacking of three or more electricity-generating elements to be compensated for by the heat dissipation performance of the first heat-conducting layer 140. As a result, a battery with a long life and high reliability can be provided.

In the fourth embodiment, as shown in FIG. 20, the third electrode layer 310, the third counter electrode layer 320, and the third solid electrolyte layer 330 may be stacked on top of each other to form a third electricity-generating element 300.

In the fourth embodiment, the layers of the third electricity-generating element 300 may, if appropriate, have the same configuration (e.g., the same area and thickness) as the layers of the first electricity-generating element 100 in the first to third embodiments.

In the fourth embodiment, the third solid electrolyte layer 330 and the first solid electrolyte layer 130 may contain the same solid electrolyte material or different solid electrolyte materials.

In the fourth embodiment, as shown in FIG. 20, a fourth current collector layer 440 may be disposed at one end of the third electricity-generating element 300.

That is, the battery 4100 according to the fourth embodiment may further include the fourth current collector layer 440.

The fourth current collector layer 440 includes a current collector electrically connected to (e.g., in direct contact with) the third counter electrode layer 320.

In the fourth embodiment, the first electrode layer 110 may be a positive electrode layer. In this case, the third electrode layer 310 may be a positive electrode layer. In this case, the third electrode material present in the third electrode layer 310 is a positive electrode material. In this case, the third counter electrode layer 320 is a negative electrode layer. In this case, the third counter electrode material present in the third counter electrode layer 320 is a negative electrode material. In this case, the fourth current collector layer 440 includes a negative electrode current collector.

Alternatively, in the fourth embodiment, the first electrode layer 110 may be a negative electrode layer. In this case, the third electrode layer 310 may be a negative electrode layer. In this case, the third electrode material present in the third electrode layer 310 is a negative electrode material. In this case, the third counter electrode layer 320 is a positive electrode layer. In this case, the third counter electrode material present in the third counter electrode layer 320 is a positive electrode material. In this case, the fourth current collector layer 440 includes a positive electrode current collector.

As described above, the first electrode layer 110 and the third electrode layer 310 may be of the same polarity so that a stacked battery in which the first electricity-generating element 100 and the third electricity-generating element 300 are connected in series can be constructed. Connecting a plurality of electricity-generating elements in series (connecting the positive electrode side of one electricity-generating element to the negative electrode side of another electricity-generating element adjacent thereto) increases the battery voltage.

In the fourth embodiment, as shown in FIG. 20, the second current collector layer 420 may be a bipolar current collector.

Alternatively, in the fourth embodiment, the second current collector layer 420 may be composed of a stack of positive and negative electrode current collectors.

In the fourth embodiment, as shown in FIG. 20, the second solid electrolyte layer 230 may be in contact with the second electrode layer 210 and the second counter electrode layer 220.

In addition, the third solid electrolyte layer 330 may be in contact with the third electrode layer 310 and the third counter electrode layer 320.

This configuration provides, for example, a stacked battery having no heat-conducting layer in the electricity-generating elements at both ends (i.e., the second electricity-generating element 200 and the third electricity-generating element 300) and having a heat-conducting layer (i.e., the first heat-conducting layer 140) in the first electricity-generating element 100 located between the electricity-generating elements at both ends. This allows the heat dissipation performance of the electricity-generating element located between the electricity-generating elements at both ends (an electricity-generating element in which more heat accumulates) to be improved through the first heat-conducting layer 140 and thus allows the heat dissipation performance of the entire stacked battery to be efficiently improved through the first heat-conducting layer 140.

In addition, since no heat-conducting layer is disposed in the electricity-generating elements at both ends (electricity-generating elements that are located on the periphery of the battery and thus exhibit relatively high heat dissipation performance), the number of heat-conducting layers can be reduced. This avoids degraded battery power characteristics due to the presence of a heat-conducting material. As a result, the heat dissipation performance of the stacked battery can be sufficiently improved without significantly degrading the power characteristics of the stacked battery.

Figure 21:
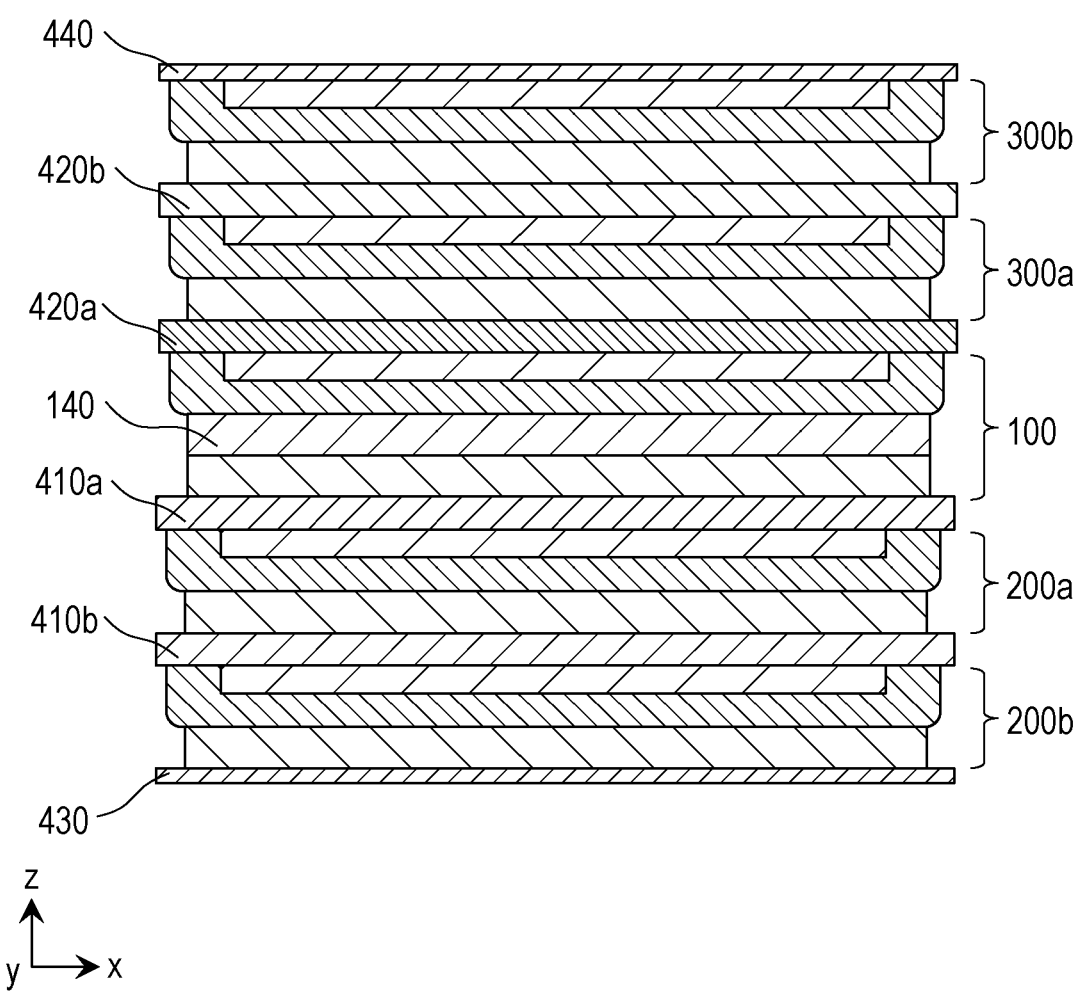
FIG. 21 is an x-z view (sectional view) showing, in outline, the configuration of a battery 4200 according to the fourth embodiment.

FIG. 21 is an x-z view (sectional view) showing, in outline, the configuration of a battery 4200 according to the fourth embodiment.

In the fourth embodiment, as shown in FIG. 21, a stacked battery may be composed of four or more electricity-generating elements.

For example, the battery 4200 shown in FIG. 21 is composed of a stack of a third current collector layer 430, a second electricity-generating element 200b, a first current collector layer 410b, a second electricity-generating element 200a, a first current collector layer 410a, a first electricity-generating element 100, a second current collector layer 420a, a third electricity-generating element 300a, a second current collector layer 420b, a third electricity-generating element 300b, and a fourth current collector layer 440.

Even if four or more electricity-generating elements are stacked on top of each other, this configuration, in which the first heat-conducting layer 140 is disposed in the center of the stack, sufficiently improves the heat dissipation performance of the stacked battery without significantly degrading the power characteristics of the stacked battery.

Figure 22:
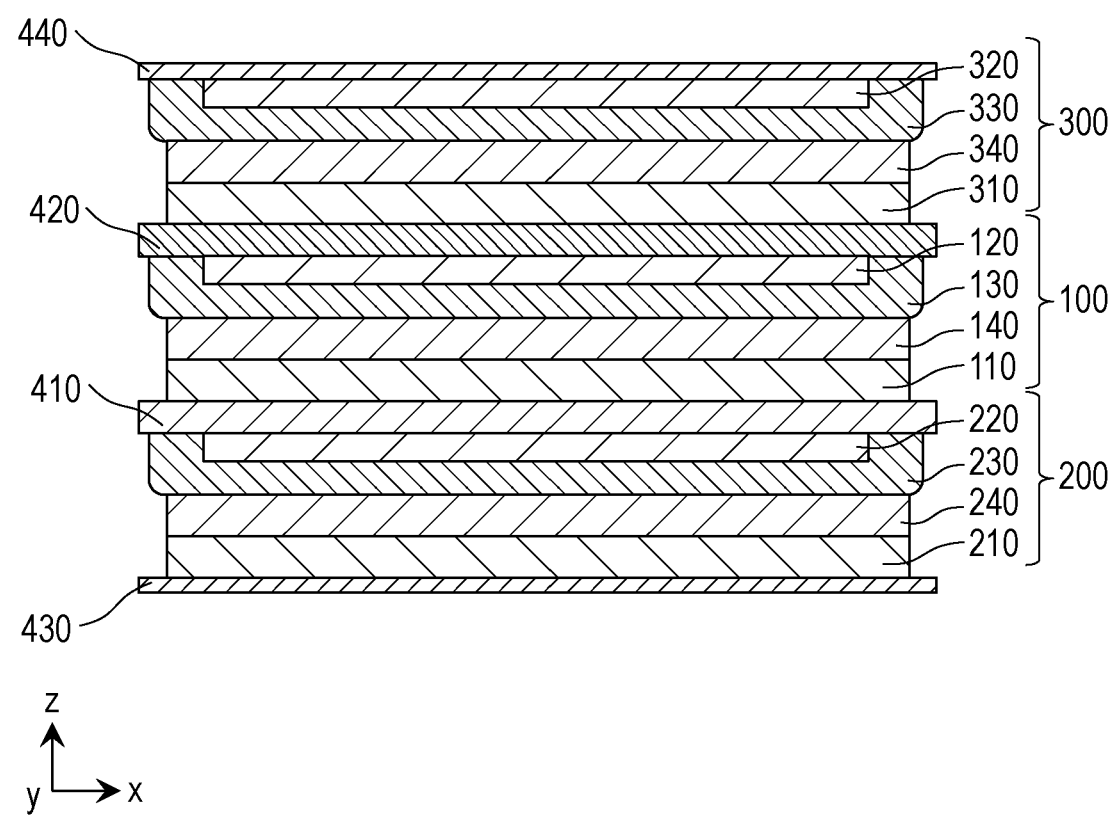
FIG. 22 is an x-z view (sectional view) showing, in outline, the configuration of a battery 4300 according to the fourth embodiment.

FIG. 22 is an x-z view (sectional view) showing, in outline, the configuration of a battery 4300 according to the fourth embodiment.

In addition to the configuration of the battery 4100 according to the fourth embodiment described above, the battery 4300 according to the fourth embodiment further includes the following configuration.

Specifically, the battery 4300 according to the fourth embodiment further includes a second heat-conducting layer 240 and a third heat-conducting layer 340.

The second heat-conducting layer 240 includes a region containing a heat-conducting material. The second heat-conducting layer 240 is located between the second electrode layer 210 and the second counter electrode layer 220.

The third heat-conducting layer 340 includes a region containing a heat-conducting material. The third heat-conducting layer 340 is located between the third electrode layer 310 and the third counter electrode layer 320.

This configuration improves the heat dissipation performance of a stacked battery composed of a stack of three or more electricity-generating elements (a battery in which more heat accumulates). Specifically, heat generated inside the stacked battery can be dissipated through the first heat-conducting layer 140, the second heat-conducting layer 240, and the third heat-conducting layer 340 outside the battery. This allows the decrease in heat dissipation performance resulting from the increase in battery thickness due to the stacking of three or more electricity-generating elements to be compensated for by the heat dissipation performance of the first heat-conducting layer 140, the second heat-conducting layer 240, and the third heat-conducting layer 340. As a result, a stacked battery with a longer life and a higher reliability can be provided.

In the fourth embodiment, as shown in FIG. 22, the second heat-conducting layer 240 may be located between the second electrode layer 210 and the second solid electrolyte layer 230, whereas the third heat-conducting layer 340 may be located between the third electrode layer 310 and the third solid electrolyte layer 330.

In the fourth embodiment, the first heat-conducting layer 140, the second heat-conducting layer 240, and the third heat-conducting layer 340 may contain the same heat-conducting material or different heat-conducting materials.

In the fourth embodiment, the second heat-conducting layer 240 and the third heat-conducting layer 340 may, if appropriate, have the same configuration (e.g., the same area and thickness) as the first heat-conducting layer 140 in the first to third embodiments.

In the fourth embodiment, the first heat-conducting layer 140, the second heat-conducting layer 240, and the third heat-conducting layer 340 may have the same size (e.g., the same area, thickness, or volume) or different sizes (e.g., different areas, thicknesses, or volumes).

In the fourth embodiment, at least one of the second heat-conducting layer 240 and the third heat-conducting layer 340 may have a lower heat-conducting material concentration than the first region of the first heat-conducting layer 140.

This configuration allows, for example, at least one of the heat-conducting layers of the electricity-generating elements at both ends to have a lower heat-conducting material content than the heat-conducting layer of the electricity-generating element located between the electricity-generating elements at both ends. Specifically, a heat-conducting layer (second heat-conducting layer 240 or third heat-conducting layer 340) having a lower heat-conducting material concentration can be disposed in at least one of the electricity-generating elements at both ends (electricity-generating elements that are located on the periphery of the battery and thus exhibit relatively high heat dissipation performance). This reduces the magnitude of the degradation in battery power characteristics due to the presence of the heat-conducting material in the electricity-generating elements at both ends while improving the heat dissipation performance of the electricity-generating element located between the electricity-generating elements at both ends (an electricity-generating element in which more heat accumulates) through the first heat-conducting layer 140, which has a higher heat-conducting material concentration. As a result, the degradation in the power characteristics of the stacked battery can be reduced while the heat dissipation performance of the stacked battery is improved.

In the fourth embodiment, both the second heat-conducting layer 240 and the third heat-conducting layer 340 may have a lower heat-conducting material concentration than the first region of the first heat-conducting layer 140.

This configuration further reduces the degradation in the power characteristics of the stacked battery while improving the heat dissipation performance of the stacked battery.

Figure 23:
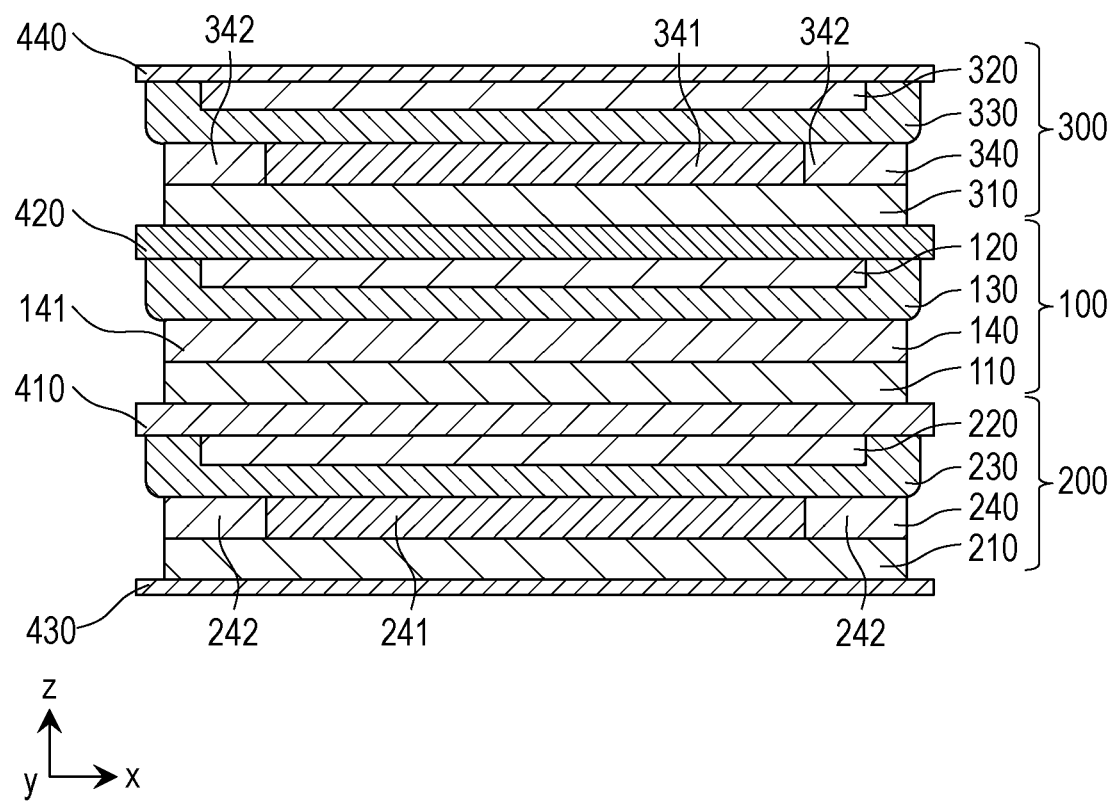
FIG. 23 is an x-z view (sectional view) showing, in outline, the configuration of a battery 4400 according to the fourth embodiment.

FIG. 23 is an x-z view (sectional view) showing, in outline, the configuration of a battery 4400 according to the fourth embodiment.

In the fourth embodiment, as shown in FIG. 23, at least one of the region, containing the heat-conducting material, of the second heat-conducting layer 240 (e.g., a first region 241) and the region, containing the heat-conducting material, of the third heat-conducting layer 340 (e.g., a first region 341) may have a smaller size than the first region 141 of the first heat-conducting layer 140. As used herein, the term "size" encompasses, for example, area, thickness, and volume.

This configuration allows, for example, a heat-conducting material to be disposed over a smaller area in at least one of the heat-conducting layers of the electricity-generating elements at both ends than in the heat-conducting layer of the electricity-generating element located between the electricity-generating elements at both ends. Specifically, a heat-conducting layer (second heat-conducting layer 240 or third heat-conducting layer 340) in which a heat-conducting material is disposed over a smaller area can be disposed in at least one of the electricity-generating elements at both ends (electricity-generating elements that are located on the periphery of the battery and thus exhibit relatively high heat dissipation performance). This reduces the magnitude of the degradation in battery power characteristics due to the presence of the heat-conducting material in the electricity-generating elements at both ends while improving the heat dissipation performance of the electricity-generating element located between the electricity-generating elements at both ends (an electricity-generating element in which more heat accumulates) through the first heat-conducting layer 140, in which a heat-conducting material is disposed over a larger area. As a result, the degradation in the power characteristics of the stacked battery can be reduced while the heat dissipation performance of the stacked battery is improved.

In the fourth embodiment, as shown in FIG. 23, both the region, containing the heat-conducting material, of the second heat-conducting layer 240 (e.g., the first region 241) and the region, containing the heat-conducting material, of the third heat-conducting layer 340 (e.g., the first region 341) may have a smaller size than the first region 141 of the first heat-conducting layer 140.

This configuration further reduces the degradation in the power characteristics of the stacked battery while sufficiently improving the heat dissipation performance of the stacked battery.

In the fourth embodiment, as shown in FIG. 23, the second heat-conducting layer 240 may include a second region 242. The second region 242 is, for example, a region of the second heat-conducting layer 240 where the first region 241 is not disposed. The third heat-conducting layer 340 may include a second region 342. The second region 342 is, for example, a region of the third heat-conducting layer 340 where the first region 341 is not disposed.

In the fourth embodiment, the second region 142 of the first heat-conducting layer 140, the second region 242 of the second heat-conducting layer 240, and the second region 342 of the third heat-conducting layer 340 may contain the same material or different materials.

Figure 24:
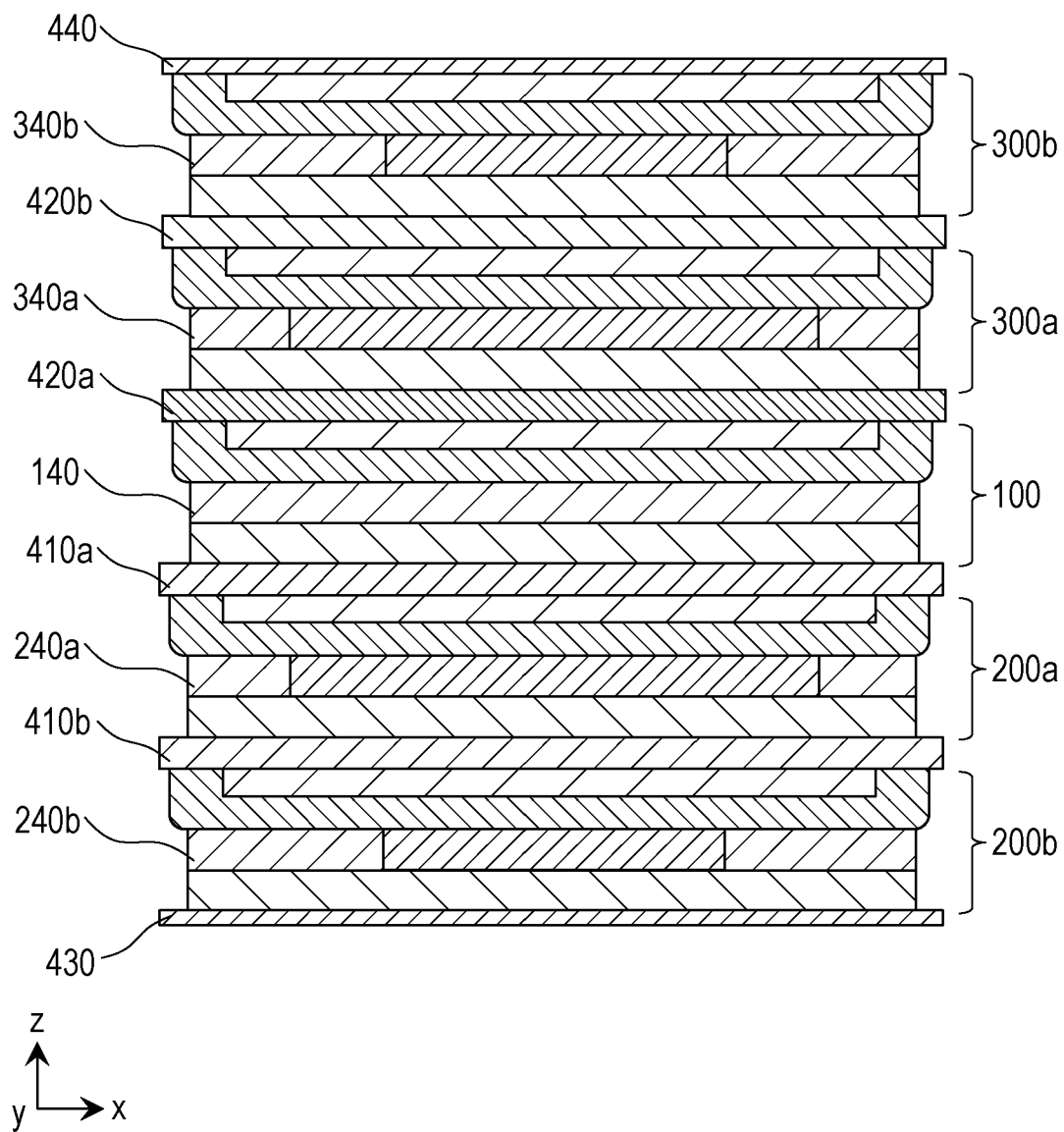
FIG. 24 is an x-z view (sectional view) showing, in outline, the configuration of a battery 4500 according to the fourth embodiment.

FIG. 24 is an x-z view (sectional view) showing, in outline, the configuration of a battery 4500 according to the fourth embodiment.

In the fourth embodiment, as shown in FIG. 24, a stacked battery may be composed of four or more electricity-generating elements.

For example, the battery 4500 shown in FIG. 24 is composed of a stack of a third current collector layer 430, a second electricity-generating element 200b (including a second heat-conducting layer 240b), a first current collector layer 410b, a second electricity-generating element 200a (including a second heat-conducting layer 240a), a first current collector layer 410a, a first electricity-generating element 100 (including a first heat-conducting layer 140), a second current collector layer 420a, a third electricity-generating element 300a (including a third heat-conducting layer 340a), a second current collector layer 420b, a third electricity-generating element 300b (including a third heat-conducting layer 340b), and a fourth current collector layer 440.

Even if four or more electricity-generating elements are stacked on top of each other, this configuration sufficiently improves the heat dissipation performance of the stacked battery through the heat-conducting layer disposed in each electricity-generating element. In addition, since the heat-conducting layers of electricity-generating elements closer to both ends of the stacked battery have smaller regions containing a heat-conducting material, the degradation in the power characteristics of the stacked battery can be further reduced while the heat dissipation performance of the stacked battery is maintained.

In the fourth embodiment, any number of electricity-generating elements may be connected in series. Increasing the number of electricity-generating elements connected in series increases the battery voltage. If electricity-generating elements with a voltage of about 3.7 V are connected in series, four electricity-generating elements may be used. In this case, the stacked battery may be used as an automotive starter power supply. If electricity-generating elements with a voltage of about 3.7 V are connected in series, 12 electricity-generating elements may be used. In this case, the stacked battery may be used as a power supply for driving a plug-in hybrid vehicle, electric vehicle, or other system.

Figure 25:
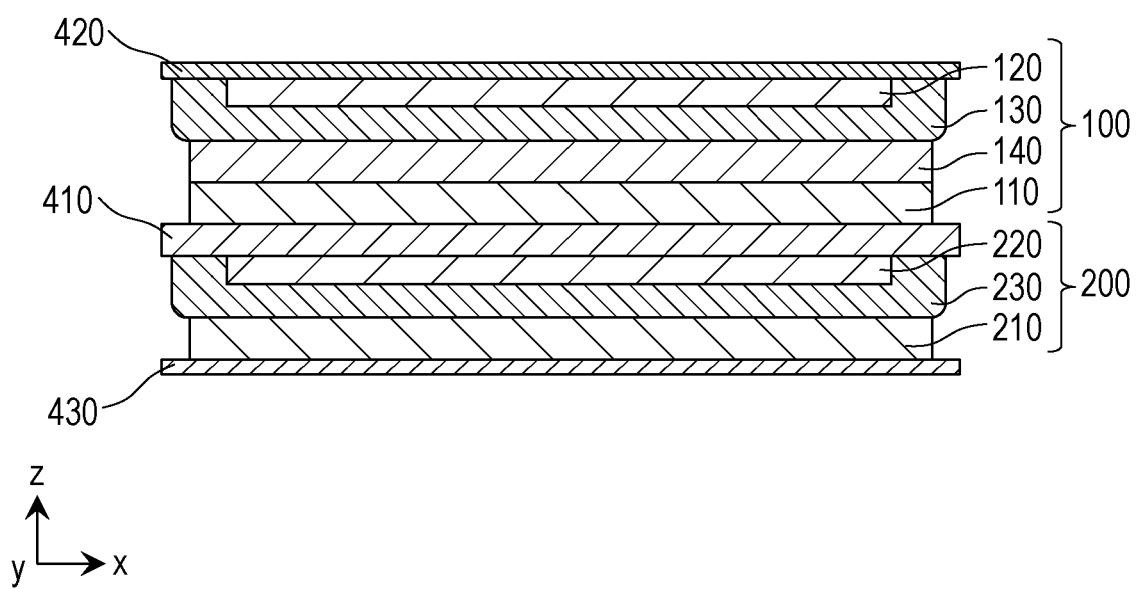
FIG. 25 is an x-z view (sectional view) showing, in outline, the configuration of a battery 4600 according to the fourth embodiment.

FIG. 25 is an x-z view (sectional view) showing, in outline, the configuration of a battery 4600 according to the fourth embodiment.

In the battery 4600 according to the fourth embodiment, the first electrode layer 110 and the second counter electrode layer 220 are of the same polarity.

Specifically, in the battery 4600 according to the fourth embodiment, the first electrode layer 110 and the second counter electrode layer 220 may be positive electrode layers. In this case, the first current collector layer 410 includes a positive electrode current collector. In this case, the first counter electrode layer 120 and the second electrode layer 210 are negative electrode layers. In this case, the second current collector layer 420 and the third current collector layer 430 include a negative electrode current collector.

Alternatively, in the battery 4600 according to the fourth embodiment, the first electrode layer 110 and the second counter electrode layer 220 may be negative electrode layers. In this case, the first current collector layer 410 includes a negative electrode current collector. In this case, the first counter electrode layer 120 and the second electrode layer 210 are positive electrode layers. In this case, the second current collector layer 420 and the third current collector layer 430 include a positive electrode current collector.

As described above, the first electrode layer 110 and the second counter electrode layer 220 may be of the same polarity so that a stacked battery in which the first electricity-generating element 100 and the second electricity-generating element 200 are connected in parallel can be constructed. Connecting a plurality of electricity-generating elements in parallel (connecting the positive electrode sides of two adjacent electricity-generating elements to each other and the negative electrode sides thereof to each other) increases the battery capacity. In addition, increasing the number of electricity-generating elements connected in parallel further increases the battery capacity.

Figure 26:
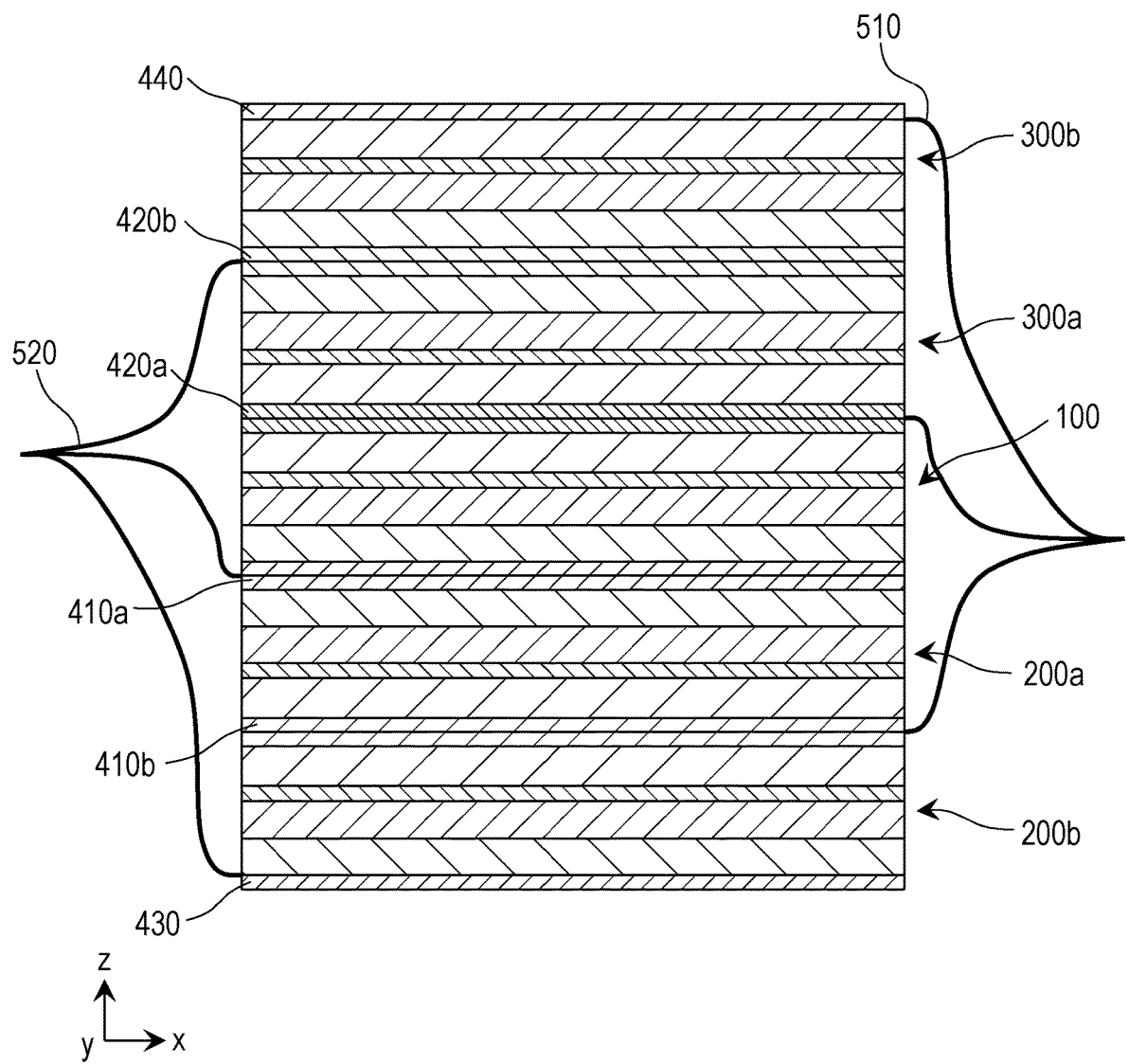
FIG. 26 is an x-z view (sectional view) showing, in outline, the configuration of a battery 4700 according to the fourth embodiment.

FIG. 26 is an x-z view (sectional view) showing, in outline, the configuration of a battery 4700 according to the fourth embodiment.

The battery 4700 according to the fourth embodiment is composed of a stack of a third current collector layer 430, a second electricity-generating element 200b, a first current collector layer 410b, a second electricity-generating element 200a, a first current collector layer 410a, a first electricity-generating element 100, a second current collector layer 420a, a third electricity-generating element 300a, a second current collector layer 420b, a third electricity-generating element 300b, and a fourth current collector layer 440.

The electricity-generating elements of the battery 4700 according to the fourth embodiment are connected in parallel.

The battery 4700 according to the fourth embodiment includes a first current collector terminal 510 and a second current collector terminal 520.

The first current collector terminal 510 is connected to the first current collector layer 410*b*, the second current collector layer 420*a*, and the fourth current collector layer 440.

The second current collector terminal 520 is connected to the third current collector layer 430, the first current collector layer 410*a*, and the second current collector layer 420*b*.

In the fourth embodiment, for the series-connected stacked batteries shown in FIGS. 21 and 24 described above, the first current collector terminal 510 is connected to the third current collector layer 430, whereas the second current collector terminal 520 is connected to the fourth current collector layer 440.

The first current collector terminal 510 and the second current collector terminal 520 are connected to a charger or load to charge or discharge the battery.

In the fourth embodiment, a combination of series and parallel connections may be used. Specifically, a stacked battery may be composed of a combination of a plurality of electricity-generating elements connected in series and in parallel. This increases both the battery capacity and the battery voltage.

The batteries according to the fourth embodiment may be of various types, such as coin batteries, cylindrical batteries, prismatic batteries, sheet batteries, button batteries, flat batteries, and stacked batteries.

Method of Manufacture

An example method for manufacturing the batteries according to the fourth embodiment will now be described.

A positive electrode layer is formed on one side of a bipolar current collector (first current collector layer 410). A solid electrolyte layer is further formed on the positive electrode layer. A negative electrode layer is then formed on the side of the bipolar current collector facing away from the positive electrode layer. A heat-conducting layer and a solid electrolyte layer are further formed on the negative electrode layer.

A plurality of bipolar electrodes having a positive electrode layer formed on one side and a negative electrode layer formed on the opposite side are fabricated depending on the number of electricity-generating elements to be stacked.

An electrode having a positive electrode layer and a solid electrolyte layer formed only on one side is also fabricated as the electrode to be located at one end of the battery.

An electrode having a negative electrode layer, a heat-conducting layer, and a solid electrolyte layer formed only on one side is also fabricated as the electrode to be located at the other end of the battery.

The thus-fabricated bipolar electrodes and electrodes to be located at both ends are stacked on top of each other. The stack is compressed under pressure by processes such as uniaxial pressing, roller pressing, and CIP to bond the bipolar electrodes together.

The above steps are performed to manufacture the batteries according to the fourth embodiment.

The steps such as applying the pastes, removing the solvent, and compressing the layers under pressure may be performed as in the method of manufacture according to the first to third embodiments.

Alternatively, a plurality of batteries is manufactured by the method for manufacturing the batteries according to the first to third embodiments. The first current collector layer 410 of one battery is then connected to the second current collector layer 420 of another battery adjacent thereto. The two batteries may be simply brought into contact with each other. Alternatively, the two batteries may be connected together, for example, by welding or using a conductive paste, conductive tape, or conductive polymer. This method allows a stacked battery to be manufactured without the use of bipolar current collectors.

In the above method of manufacture, the presence or absence (or the size or heat-conducting material content) of a heat-conducting layer in each electricity-generating element may be selected for the manufacture of the batteries according to the fourth embodiment.

The configurations according to the first to fourth embodiments described above may be used in any suitable combination.

The batteries according to the present disclosure may be used as, for example, all-solid-state lithium secondary batteries.

What is claimed is:

1. A battery comprising:
a first electrode layer;
a first counter electrode layer being a counter electrode of the first electrode layer;
a first solid electrolyte layer located between the first electrode layer and the first counter electrode layer; and
a first heat-conducting layer including a first region containing a heat-conducting material,
wherein the first region is located between the first electrode layer and the first solid electrolyte layer,
the first heat-conducting layer includes a second region different from the first region,
the first region has a higher heat-conducting material concentration than the second region,
the first region is located at an edge of a region where the first electrode layer and the first solid electrolyte layer face each other, and
the second region is located in a center of the region where the first electrode layer and the first solid electrolyte layer face each other.

2. The battery according to claim 1, wherein
the first region contains a solid electrolyte material.

3. The battery according to claim 1, wherein
the first electrode layer contains a first electrode material,
the first counter electrode layer contains a first counter electrode material, and
the first region is free of the first electrode material and the first counter electrode material.

4. The battery according to claim 1, wherein
the first solid electrolyte layer contains an inorganic solid electrolyte material.

5. The battery according to claim 1, wherein
the second region contains a solid electrolyte material.

6. The battery according to claim 1, wherein
the first electrode layer contains a first electrode material, and
the second region contains the first electrode material.

7. The battery according to claim 1, wherein
the first heat-conducting layer includes a third region containing a heat-conducting material, and
the third region covers an end of the first electrode layer.

8. The battery according to claim 1, further comprising
a first current collector layer electrically connected to the first electrode layer,
wherein the first heat-conducting layer includes a third region containing a heat-conducting material, and
the third region is in contact with the first current collector layer.

9. The battery according to claim 1, further comprising
a first-counter-electrode-side heat-conducting layer containing a heat-conducting material,
wherein the first-counter-electrode-side heat-conducting layer is located between the first counter electrode layer and the first solid electrolyte layer.

10. The battery according to claim 9, wherein
the first-counter-electrode-side heat-conducting layer covers an end of the first counter electrode layer.

11. The battery according to claim 9, further comprising
a second current collector layer electrically connected to the first counter electrode layer,
wherein the first-counter-electrode-side heat-conducting layer is in contact with the second current collector layer.

12. The battery according to claim 1, further comprising
a first-electrode-side solid electrolyte layer,
wherein the first-electrode-side solid electrolyte layer is located between the first electrode layer and the first heat-conducting layer.

13. The battery according to claim 12, wherein
the first-electrode-side solid electrolyte layer contains an inorganic solid electrolyte material.

14. The battery according to claim 1, further comprising:
a second electrode layer;
a second counter electrode layer being a counter electrode of the second electrode layer;
a second solid electrolyte layer located between the second electrode layer and the second counter electrode layer; and
a first current collector layer electrically connected to the first electrode layer and the second counter electrode layer,
wherein the first electrode layer and the second counter electrode layer are stacked with the first current collector layer therebetween.

15. The battery according to claim 14, further comprising:
a third electrode layer;
a third counter electrode layer being a counter electrode of the third electrode layer;
a third solid electrolyte layer located between the third electrode layer and the third counter electrode layer; and
a second current collector layer electrically connected to the first counter electrode layer and the third electrode layer,
wherein the first counter electrode layer and the third electrode layer are stacked with the second current collector layer therebetween.

16. The battery according to claim 15, wherein
the second solid electrolyte layer is in contact with the second electrode layer and the second counter electrode layer, and
the third solid electrolyte layer is in contact with the third electrode layer and the third counter electrode layer.

17. The battery according to claim 15, further comprising:
a second heat-conducting layer including a region containing a heat-conducting material; and
a third heat-conducting layer including a region containing a heat-conducting material,
wherein the second heat-conducting layer is located between the second electrode layer and the second counter electrode layer, and
the third heat-conducting layer is located between the third electrode layer and the third counter electrode layer.

18. The battery according to claim 17, wherein
at least one of the second heat-conducting layer and the third heat-conducting layer has a lower heat-conducting material concentration than the first region.

19. The battery according to claim 17, wherein
at least one of the region, containing the heat-conducting material, of the second heat-conducting layer and the region, containing the heat-conducting material, of the third heat-conducting layer has a smaller size than the first region.

* * * * *